United States Patent
Shalaby et al.

(10) Patent No.: US 9,880,999 B2
(45) Date of Patent: Jan. 30, 2018

(54) NATURAL LANGUAGE RELATEDNESS TOOL USING MINED SEMANTIC ANALYSIS

(71) Applicant: THE UNIVERSITY OF NORTH CAROLINA AT CHARLOTTE, Charlotte, NC (US)

(72) Inventors: Walid A. Shalaby, Charlotte, NC (US); Wlodek W. Zadrozny, Charlotte, NC (US); Kripa Rajshekhar, Deerfield, IL (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 0 days.

(21) Appl. No.: 15/200,926

(22) Filed: Jul. 1, 2016

(65) Prior Publication Data

US 2017/0004129 A1 Jan. 5, 2017

Related U.S. Application Data

(60) Provisional application No. 62/188,578, filed on Jul. 3, 2015.

(51) Int. Cl.
*G06F 17/30* (2006.01)
*G06F 17/22* (2006.01)
*G06F 17/27* (2006.01)

(52) U.S. Cl.
CPC ...... *G06F 17/2785* (2013.01); *G06F 17/2735* (2013.01); *G06F 17/30734* (2013.01)

(58) Field of Classification Search
CPC ........... G06F 17/30; G06F 17/22; G06F 17/27
(Continued)

(56) References Cited

U.S. PATENT DOCUMENTS 7,124,149 B2 * 10/2006 Smith ............... G06F 17/30265
9,183,293 B2 * 11/2015 Li ..................... G06F 17/30734
(Continued)

OTHER PUBLICATIONS

Shalaby et al., "Measuring semantic relatedness using mined semantic analysis." arXiv preprint arXiv:1512.03465 (2015).*
(Continued)

*Primary Examiner* — Seong Ah A Shin
(74) *Attorney, Agent, or Firm* — Marshall, Gerstein & Borun LLP

(57) ABSTRACT

Mined semantic analysis techniques (MSA) include generating a first subset of concepts, from a NL corpus, that are latently associated with an NL candidate term based on (i) a second subset of concepts from the corpus that are explicitly or implicitly associated with the candidate term and (ii) a set of concept association rules. The concept association rules are mined from a transaction dictionary constructed from the corpus and defining discovered latent associations between corpus concepts. A concept space of the candidate term includes at least portions of both the first and second subset of concepts, and includes indications of relationships between latently-associated concepts and the explicitly/implicitly-associated concepts from which the latently-associated concepts were derived. Measures of relatedness between candidate terms are deterministically determined based on their respective concept spaces. Example corpora include digital corpora such as encyclopedias, journals, intellectual property datasets, health-care related datasets/records, financial-sector related datasets/records, etc.

18 Claims, 9 Drawing Sheets

(58) Field of Classification Search
USPC ...................................... 704/9, 236; 707/776
See application file for complete search history.

(56) References Cited

U.S. PATENT DOCUMENTS

| | | | | |
|---|---|---|---|---|
| 9,218,339 | B2* | 12/2015 | Zechner | G06F 17/28 |
| 9,348,816 | B2* | 5/2016 | Gupta | G06F 17/279 |
| 9,460,455 | B2* | 10/2016 | Hardeniya | G06Q 30/0256 |
| 2005/0165600 | A1* | 7/2005 | Kasravi | G06F 17/2211 |
| | | | | 704/9 |
| 2008/0004864 | A1* | 1/2008 | Gabrilovich | G06F 17/27 |
| | | | | 704/9 |
| 2010/0217592 | A1* | 8/2010 | Gupta | G06F 17/279 |
| | | | | 704/236 |
| 2012/0089642 | A1* | 4/2012 | Milward | G06F 17/30616 |
| | | | | 707/776 |
| 2013/0282647 | A1* | 10/2013 | Sweeney | G06F 17/30731 |
| | | | | 706/55 |
| 2014/0195562 | A1* | 7/2014 | Hardeniya | G06Q 30/0256 |
| | | | | 707/776 |
| 2015/0278192 | A1* | 10/2015 | Bretter | G06F 17/2785 |
| | | | | 704/9 |
| 2015/0332049 | A1* | 11/2015 | Chen | G06F 21/57 |
| | | | | 726/22 |
| 2015/0370784 | A1* | 12/2015 | Nissan | G06F 17/2809 |
| | | | | 704/2 |

OTHER PUBLICATIONS

Gabrilovich et al., "Computing semantic relatedness using wikipedia-based explicit semantic analysis." IJcAI. vol. 7. 2007.*
Shalaby et al., "Knowledge based dimensionality reduction for technical text mining." Big Data (Big Data), 2014 IEEE International Conference on. IEEE, 2014.*
Shalaby et al., "Knowledge based dimensionality reduction for technical text mining", IEEE International Conference on Big Data, pp. 39-44 (2014).
InnovationQ Plus product sheet, Powered by IEEE and IP.com (2 pages) (www.ieee.org/innovationqplus, accessed Apr. 2016).

* cited by examiner

FIG. 3B

|         | MC   | RG   | WSS  | WSR  | WS   |
|---------|------|------|------|------|------|
| LSA     | 0.73 | 0.64 | -    | -    | 0.56 |
| ESA     | 0.74 | 0.72 | 0.45 | -    | 0.49 |
| SSAs    | 0.87 | 0.85 | -    | -    | 0.62 |
| SSAc    | 0.88 | 0.86 | -    | -    | 0.59 |
| ADW     | 0.79 | 0.91 | 0.72 | -    | -    |
| NASARI  | 0.91 | 0.91 | 0.74 | -    | -    |
| Word2Vec| 0.82 | 0.84 | 0.76 | 0.65 | 0.68 |
| MSA$_t$ | 0.96 | 0.88 | 0.72 | 0.64 | 0.65 |
| MSA$_x$ | 0.96 | 0.91 | 0.77 | 0.68 | 0.70 |

FIG. 4A

|           | MC   | RG   | WSS  | WSR  | WS   |
|-----------|------|------|------|------|------|
| LSA       | 0.66 | 0.61 | -    | -    | 0.58 |
| ESA       | 0.70 | 0.75 | 0.53 | -    | 0.75 |
| SSAs      | 0.81 | 0.83 | -    | -    | 0.63 |
| SSAc      | 0.84 | 0.83 | -    | -    | 0.60 |
| CW        | -    | 0.89 | 0.77 | 0.46 | 0.60 |
| BOW       | -    | 0.81 | 0.70 | 0.62 | 0.65 |
| NASARI    | 0.80 | 0.78 | 0.73 | -    | -    |
| ADW       | 0.90 | 0.92 | 0.75 | -    | -    |
| GloVe     | 0.84 | 0.83 | -    | -    | 0.76 |
| Word2Vec$_1$ | 0.82 | 0.84 | 0.76 | 0.64 | 0.71 |
| Word2Vec$_x$ | -    | 0.84 | 0.80 | 0.70 | 0.75 |
| MSA$_t$ | 0.93 | 0.88 | 0.72 | 0.68 | 0.69 |
| MSA$_x$ | 0.93 | 0.89 | 0.75 | 0.72 | 0.73 |

FIG. 4B

NATURAL LANGUAGE RELATEDNESS TOOL USING MINED SEMANTIC ANALYSIS

RELATED APPLICATIONS

The present application claims priority to and the benefit of the filing date of U.S. Provisional Patent Application No. 62/188,578 entitled "Mined Semantic Analysis" and filed on Jul. 3, 2015, the entire disclosure of which is hereby incorporated by reference for all purposes.

TECHNICAL FIELD

The present disclosure relates to tools and techniques for determining the relatedness of a natural language object such as one or more words, terms, phrases, documents, etc. to other natural language objects.

BACKGROUND

Recently, semantic analysis (SA) has been gaining an enormous amount of attention in the computational linguistics (CL) and Natural Language Processing (NLP) communities. In particular, researchers have been focusing on techniques for evaluating or measuring lexical and semantic similarity and/or relatedness between words, terms, and/or other natural language objects. Generally speaking, measuring the similarity between natural language terms is typically directed to measuring the resemblance between the meanings of the terms, and as such focuses on synonymous relationships or synonymy (e.g., "smart," "intelligent"). On the other hand, measuring the relatedness between natural language terms typically is broader than measuring similarity, as it focuses on additional relationships between the terms, such as antonymy (e.g., "old," "new"), hypernymy (e.g., "rooster," "bird"), and numerous other functional associations (e.g., "money," "bank").

Evaluating lexical and semantic similarity and/or relatedness is a knowledge intensive task. Typically, known evaluation techniques are corpus-based, and leverage the occurrences and associations between words and/or other linguistic terms occurring therein by utilizing a Distributional Semantics (DS) model, for example, by representing each linguistic term as a vector. Relatedness between linguistic terms is then calculated using vector similarity measures (e.g., cosine similarity, or other suitable technique).

In some known semantic analysis techniques, vectors are constructed from direct or explicit mentions of linguistic terms and explicit mentions of their associations with other linguistic terms within a large corpus of text or knowledge base. Examples of such direct or explicit techniques include Explicit Semantic Analysis (ESA), Salient Semantic Analysis (SSA), NASARI (a Novel Approach to a Semantically-Aware Representation of Items), to name a few. Direct or explicit semantic techniques use the direct or explicit mentions of linguistic terms and their associations with other linguistic terms occurring in text corpora and/or in dictionary corpora to generate explicit DS models for use in determining semantic relatedness. Generally, with direct or explicit semantic analysis techniques, semantic relatedness between linguistic terms is deterministically calculated.

Other commonly known, corpus-based semantic relatedness techniques construct vectors based on indirect or implicit associations between linguistic terms or concepts represented in a corpus. Accordingly, in these indirect or implicit techniques, vectors that represent linguistic terms/objects are indirectly derived from the textual information within a corpus or knowledge base (as contrasted with the explicit derivation techniques described above). For example, the vectors representing the linguistic terms may be estimated by statistical modeling and/or through neural embeddings. Examples of such indirect or implicit techniques include probabilistic/count models such as Latent Semantic Analysis (LSA) and Latent Dirichlet Allocation (LDA), and neural network models such as CW vectors, Word2Vec, and GloVe. Accordingly, with indirect or implicit semantic and analysis techniques, semantic relatedness is probabilistically and/or statistically determined.

SUMMARY OF THE DISCLOSURE

In an embodiment, a natural language-relatedness (NLR) tool includes an input interface via which an initial subset of a set of concepts of a corpus is received. The corpus may comprise multiple natural language terms, for example. Each concept of the initial subset of concepts is semantically associated with a candidate term that comprises one or more natural language words, and the semantic associations of the initial subset of concepts with the candidate term is or has been determined based on a first semantic analysis of the corpus. The NLR tool further includes a concept expander comprising first computer-executable instructions that are stored on one or more memories and that, when executed by one or more processors, cause the NLR tool to mine, based on the initial subset of concepts, a set of concept association rules of the corpus to discover an expansion subset of concepts of the corpus. Each concept of the expansion subset of concepts is semantically associated with the candidate term, for example. Additionally, the NLR tool includes a concept space generator comprising second computer-executable instructions that are stored on the one or more memories and that, when executed by the one or more processors, cause the NLR tool to generate a concept space of the candidate term, where the concept space includes at least a portion of the initial subset of concepts and at least a portion of the expansion subset of concepts.

In an embodiment, a method of generating a concept space of a natural language term within a corpus includes receiving a candidate term that comprises one or more natural language words, and applying a first semantic analysis technique to a corpus based on the candidate term, thereby discovering a first set of concepts associated with the candidate term. The corpus comprises natural language, for example. Each concept included in the first set of concepts comprises a respective one or more natural language words or terms, each of which is at least one of explicitly or implicitly associated with the candidate term. Additionally, the method includes applying a second semantic analysis technique to the first set of concepts, thereby discovering a second set of concepts associated with the candidate term. The application of the second semantic analysis technique includes mining a set of concept association rules based on the first set of concepts, and the set of concept association rules is generated based on record-links included in records of the corpus. Each concept included in the second set of concepts comprises a respective one or more natural language terms, each of which is latently associated with the candidate term. The method further includes generating a concept space for the candidate term from the first set of concepts and the second set of concepts, where the concept space for the candidate term is a subset of a total set of concepts included in the corpus.

In an embodiment, a method of determining a concept space of a natural language term within a corpus includes mining a corpus for a set of concept association rules of the corpus. The corpus comprises natural language, and the set of concept association rules is determined based on record-links included or indicated in a plurality of records of the corpus. The method also includes discovering, based on the set of concept association rules and an initial subset of concepts of the corpus that are at least one of explicitly or implicitly associated with a candidate term that comprises one or more natural language words or terms, an expansion subset of concepts of the corpus that are latently associated with the candidate term. Additionally, the method includes generating a concept space of the candidate term from at least a portion of the initial subset of concepts and at least a portion of the expansion subset of concepts, where each concept included in the concept space includes a respective one or more natural language words or terms.

BRIEF DESCRIPTION OF THE DRAWINGS

FIGS. 3B-3D illustrate an example scenario in which an NLR tool was utilized to discover and present knowledge contained within an intellectual property corpus that was found to be most semantically related to or associated with a particular webpage;

FIGS. 4A and 4B depict the results of a benchmarking comparison between MSA and other known semantic analysis techniques;

DETAILED DESCRIPTION

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

Figure 1:
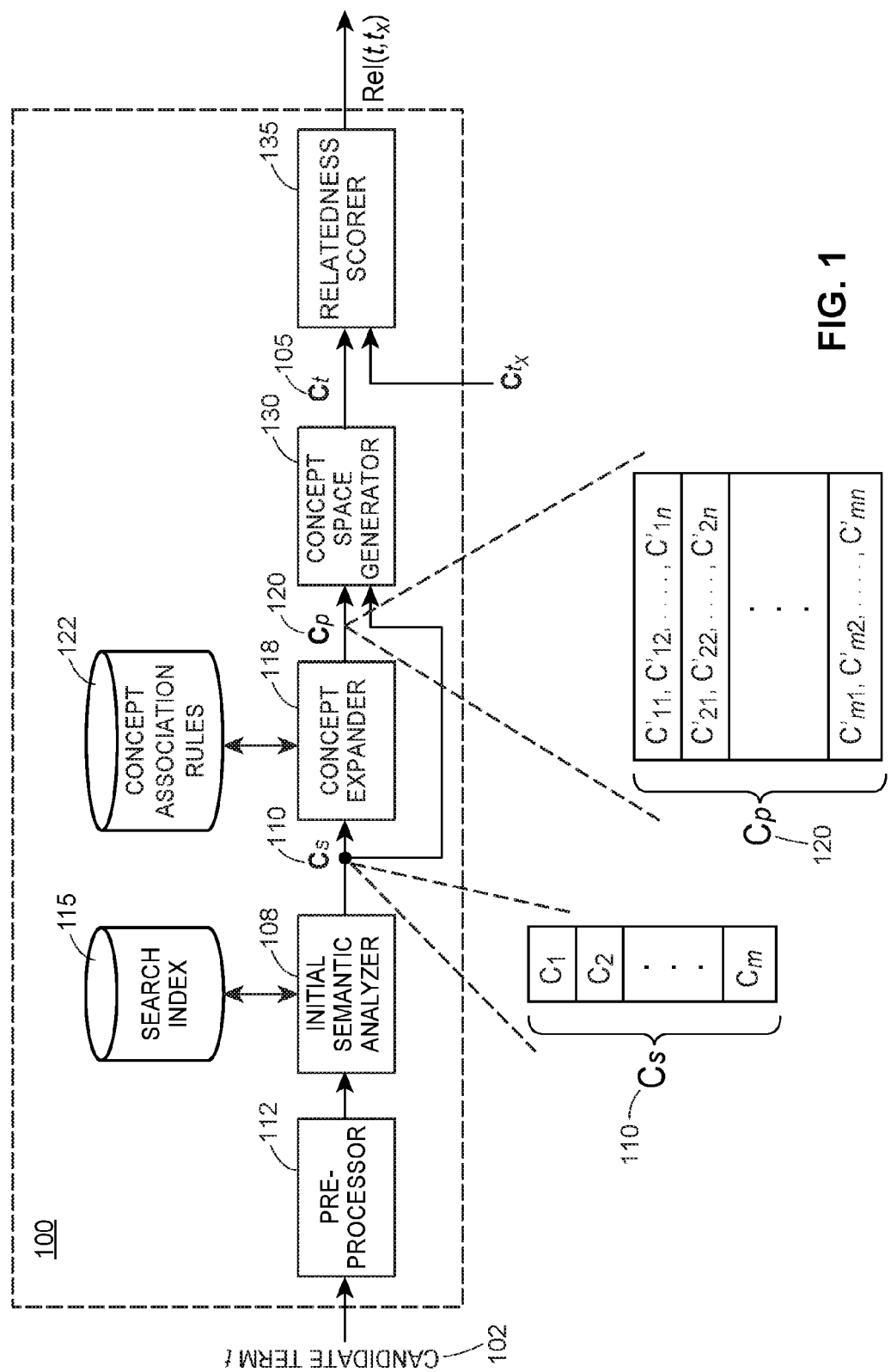
FIG. 1 is a block diagram of an example Natural Language Relatedness (NLR) tool that utilizes Mined Semantic Analysis (MSA) techniques.

FIG. 1 includes a block diagram of an example Natural Language Relatedness (NLR) tool 100. The NLR tool 100 utilizes a novel Mined Semantics Analysis (MSA) technique to determine natural language-relatedness between natural language objects, such as words, terms, phrases, paragraphs, chapters, articles, documents, etc. As used herein, a "word" generally refers to a unit of language that comprises a written representation of one or more spoken sounds and that functions as a principal carrier of meaning. "Words" typically are separated by spaces in writing, and are distinguished phonologically in many languages. A "term," as used herein, generally refers to a word or group of words designating or naming something, e.g., in a particular field or subject area, such as atom in physics, quietism in theology, and district leader in politics. Accordingly, a "term" may be any word or group of words that is considered as a member of a linguistic construction and, as such, "term" is used interchangeably herein with the word "name." A "phrase," as used herein, generally refers to a sequence of two or more words that are arranged in a grammatical construction and acting as a unit in a sentence. A "phrase" may include one or more terms, and is used interchangeably herein with the word "expression."

The NLR tool 100 shown in FIG. 1 deterministically measures, calculates, or determines natural language relatedness between natural language objects from information included in a corpus or knowledge base, and as such, relatedness between natural language objects may be represented as direct, numerical measures. However, unlike the explicit and implicit semantic analysis techniques described in the Background (e.g., ESA, SSA, NASARI, LSA, LDA, Word2Vec, etc.), the NLR tool 100 is not limited to only leveraging the direct/explicit mentions and associations of words within the corpus to determine relatedness, as is done directly with explicit semantic techniques, and as is done indirectly by implicit semantic technique). Instead, the NLR tool 100 also mines, discovers, or otherwise identifies concepts within the corpus that are latently related to a target search object, and utilizes these additional, discovered latent concepts to enrich, expand, or augment the space used to determining semantic relatedness between the target object and other natural language objects. As such, measures or indications of relatedness that are determined by the NLR tool 100 using Mined Semantic Analysis techniques are more accurate than those determined by explicit and implicit semantic analysis techniques.

A "concept," as used herein, generally refers to a notion, an idea, a construct, an object of thought, etc., and typically is represented by one or more words, terms, and/or phrases. Concepts within a corpus may have a name, title, or identifier (which typically comprises one or more words, numbers, or alphanumeric strings), and may have a description comprising words, terms, phrases, sentences, paragraphs, citations, indications of corresponding characteristics and/or indicia (which may be represented as data or metadata), etc. that are individually and/or collectively indicative or descriptive of the concept. In some corpora, concepts have a one-to-one-relationship with records or other units of the corpus. For example, in an encyclopedia comprising a plurality of encyclopedia articles, each encyclopedia article may respectively correspond to and describe the particular concept that is named by its article title.

A "latent" concept, as generally referred to herein, is a concept within a corpus that is lexically and/or semantically related or associated with a target search object, however, this association is typically not identifiable or discoverable by either explicit or implicit semantic analysis techniques.

For example, the association of a latent concept with a target search object typically is not explicitly mentioned within a corpus, and thus cannot be discovered or identified by direct or explicit semantic analysis techniques. Additionally, the association of a latent concept with the target search object also cannot be deterministically discovered or identified by indirect or implicit semantic analysis techniques, as such techniques are based on the application of statistics, probability, and/or learning to explicit mentions of terms within a corpus. Such indirect or implicit semantic analysis techniques typically determine relatedness in a new space, for example, in a space into which linguistic vectors have mapped (e.g., by utilizing singular-value decomposition or other suitable technique). Accordingly, the relatedness results that are determined in the new space cannot be easily—if at all—interpreted or represented deterministically, let alone be mapped back into an interpretable domain or representation. As such, unlike the estimations generated by indirect or implicit semantic analysis techniques, the associations of latent concepts with the linguistic objects are able to be deterministically determined and measured. Consequently, with the novel techniques described herein, and also unlike indirect or implicit semantic analysis techniques, relatedness between linguistic objects is able to be deterministically measured and presented by MSA in an interpretable form.

Moreover, further unlike indirect or implicit semantic analysis techniques, the NLR tool 100 using MSA is able to, with only a single execution, pass, or run, deterministically determine the relatedness of the mined, discovered, or identified latent concepts that contribute to the meaning of a target search object even when a target search object has multiple meanings (such as the term "thread," which may mean a sewing cord, a helical ridge of a screw, a sequence of programmed instructions that can be managed by a computer scheduler, or to move one's way through a passage or between obstacles). Still further unlike indirect or implicit semantic analysis techniques, the NLR tool 100 using MSA is also able to, in a single execution, pass, or run, determine the latent concepts of a target search object even when the target search object is an n-gram, where n is greater than one.

At any rate, the NLR tool 100 illustrated in FIG. 1 corresponds to a corpus of text or knowledge base C (which is not shown in FIG. 1). The corpus or knowledge base C may comprise one or more text corpora and/or one or more dictionary corpora, each of which includes therein multiple, different concepts $c_i$, for example. As will be explained in more detail below, the NLR tool 100 is configured to determine natural language relatedness between an input natural language object 102 and one or more other natural language objects 105 included in the corpus or knowledge base C based on the mining of the corpus C. That is, the NLR tool 100 is configured to perform mined semantic analysis (MSA), as is described in detail below.

In FIG. 1, a natural language object 102 that is input into the tool 100 is depicted as a candidate term t, although it is understood that the NLR tool 100 may operate on any type of natural language object that is input 102 into the tool 100, such as one or more words, terms, phrases, paragraphs, chapters, articles, documents, and the like. The NLR tool 100 may determine and generate one or more natural language objects 105 corresponding to the candidate term t (102), which is depicted in FIG. 1 as a concept space $C_t$ (reference 105). Concept space $C_t$ 105 may comprise a subset of concepts, from the corpus or knowledge base C, that are the most lexically and/or semantically related to the candidate term t (102) as compared to other concepts from the corpus C. For example, the concept space $C_t$ 105 may include one or concepts that are explicitly or implicitly related to the candidate term t (102), as well as one or more concepts that are latently related to the candidate term t (102) that have been determined based on a mining of the corpus C. Relatedness of concepts may be determined based on synonymy, antonymy, hypernymy, and/or other types of associations. For example, the concepts "political party" and "caucus" are related, the concepts "needle" and "tailor" are related, and the concepts "cacophony" and "melodic theme" are related. Accordingly, if the corpus or knowledge base C to which the NLR tool 100 corresponds includes therein a total number of concepts N, the concept space $C_t$ (105) of the candidate term t (102) includes a subset of the concepts N that are most lexically and/or semantically related to the candidate term t (102).

Generally speaking, the corpus or knowledge base C corresponding to the NLR tool 100 includes a plurality of corpus units or corpus records $c_i$, each of which has a generally similar format, and each of which may be identified or named by its respective base concept. In an example, the corpus C includes a total of N units or records, each of which has a title or name that indicates its associated base concept. Each corpus unit or record $c_i$ includes respective natural language therein, although some corpus units or records may also include numbers, graphics, drawings, video clips, and other information that is not represented in natural language. In an example, a corpus or knowledge base is an electronic encyclopedia, each corpus unit is an article or entry within the encyclopedia, and the base concept of each corpus unit is the title or name of the encyclopedia article or entry. For instance, a corpus may be a set of Wikipedia articles, each corpus unit or record is an individual Wikipedia article, and the base concept of the individual Wikipedia article is its title.

In another example, a corpus or knowledge base is a dataset or database of similarly formatted files, entries, or records, each of which includes respective natural language therein (and may optionally also include numbers, graphics, drawings, and/or other information that is not represented by natural language). For example, a corpus may be a dataset or database of patents and patent publications, each corpus unit or record within the corpus may be a single patent or patent publication, and the base concept of each corpus unit may be the title and/or the numerical identifier of the patent or patent publication. In another example, a corpus or knowledge base is a collection of court decisions of legal cases, each corpus unit or record within the corpus may be an individual decision, and the base concept of each corpus unit may be the name and/or the docket number of the particular legal case.

In yet another example, a corpus or knowledge base is a dataset or database of articles, each of which includes respective natural language therein (and may optionally also include numbers, graphics, drawings, and/or other information that is not represented by natural language). The articles may be related in some manner, e.g., by topic or subject, by author, by publisher, etc. For example, a corpus may be a collection of articles that have been published in a journal, perhaps over multiple years. Each corpus unit within the corpus may be an individual article, and the base concept of each corpus unit may be the title of the article.

Of course, other examples of different types of corpora are possible. For example, a corpus may be an encyclopedia; a catalog; a set of articles, documents, and/or publications; an intellectual property-related database, dataset, articles, or collection; a medical- and/or health care-related database, dataset, articles or collection; a financial- or economic-related database, dataset, articles or collection; or any other type of natural language database, dataset, articles, or collection of records or units that are related in topic, subject matter, and/or in general structure, syntax, or format.

In some configurations, multiple corpora of different types may be combined into an integral corpus and operated on as a whole by the NLR tool 100. That is, an integral corpus may comprise multiple, mutually exclusive corpora, and/or an integral corpus may include multiple corpora, at least some of whose respective units or records have different formats or syntaxes. For example, an integral corpus on which the tool 100 operates or is based may include both a set of Wikipedia articles and an intellectual property-related dataset comprising patents and patent publications. For ease of reading, the singular term "corpus" is utilized herein, however, it is understood that a "corpus" may include one, two, or more corpora.

In FIG. 1, the example NLR tool 100 includes an initial semantic analyzer 108 that operates on the candidate term t (102) to discover or identify an initial set of concepts $C_s$ 110 from the corpus C that are more closely related to the candidate input term t 102 than are other concepts of the corpus C. In a preferred embodiment, the initial semantic analyzer 108 may utilize ESA, SSA, NASARI, a dictionary-based semantic technique, or any other desired direct or explicit semantic analysis technique to the corpus to determine the initial set of concepts $C_s$ 110 related to the candidate input term t 102. In other embodiments, though, the initial semantic analyzer 108 may utilize LSA, LDA, or another indirect or implicit semantic analysis technique. At any rate, the initial semantic analyzer 108 outputs an initial set of concepts $C_s$ 110 that are identified as being more related to the candidate term t (102) as a result of the semantic analysis technique being applied to the corpus C based on the input candidate term t (102).

In some embodiments, prior to the input candidate term t (102) being provided to the initial semantic analyzer 108, the input candidate term t (102) may be pre-processed, e.g. by the pre-processor 112. The pre-processor 112 may apply any one or more known techniques to transform the raw input candidate term t into a form which is more easily or readily analyzed by the initial semantic analyzer 108. For example, the pre-processor 112 may parse the input candidate term t into a list of words and may remove punctuation, formatting, etc. The pre-processor 112 may stem the input candidate term t (102). For example, a stemmer included in the pre-processor may identify the words "walks", "walker", "walking", and "walked" as being based on the word "walk". Additionally or alternatively, the pre-processor 112 may process the input candidate term t to remove various other words such as "etc.", "a", "an", "the", "if", "too", and/or perform other desired pre-processing of the input candidate term t (102).

Returning to the initial semantic analyzer 108, in some embodiments, to identify or generate the initial set of related concepts $C_s$ 110 associated with the input candidate term t (102), the initial semantic analyzer 108 utilizes a search index 115 to search the corpus or knowledge base C with respect to the candidate term t (102). The search index 115 is built from the corpus or knowledge base C, and typically is stored on one or more data storage devices that are accessible to the initial semantic analyzer 108. For example, as shown in FIG. 1, the search index 115 is included in the NLR tool 100. In other examples (not shown), the search index 115 is excluded from the NLR tool 100, but otherwise is communicatively connected to the NLR tool 100. In some configurations, the search index 115 is an inverted search index. For example, the initial semantic analyzer 108 may utilize ESA, and the search index 115 may be an inverted search index.

In some embodiments, the initial semantic analyzer 108 limits the search space of the corpus C based on one or more parameters, e.g., to provide more control over the search. One example of such a search-limiting parameter is a minimum length L of an entry or record of the corpus or knowledge base C. For example, if the corpus is an encyclopedia, only encyclopedia articles having at least a minimum number of bytes (e.g., L=1000) may be included in the search space. Another search-limiting parameter F may indicate a target search field that defines how much of each record is to be searched (e.g., the entirety of a record, the first paragraph of a record, the first l lines of a record, etc.). Other search-limiting parameters may include, for example, a maximum number of records M to retrieve as initial candidates for the search space, and/or a maximum length of a title or name/identifier τ of a record (e.g., records with title lengths greater than the maximum length τ are not included in the search space). Of course, search-limiting parameters are not limited to those described above, but may additionally or alternatively include other types of search-limiting parameters.

As previously mentioned, the output $C_s$ 110 generated by the initial semantic analyzer 108 comprises an initial subset of the concepts included in the corpus or knowledge base C that have been determined by the initial semantic analyzer 108 as being most closely related (e.g., as determined explicitly or implicitly) to the candidate input term t 102. A total number of concepts m included in the initial set of concepts $C_s$ 110 typically is less than the total number of concepts N of the entire corpus, e.g., m<=N. As such, the initial set of concepts $C_s$ 110 is a subset of the corpus C. In an embodiment, the subset of initial concepts $C_s$ 110 for the candidate term t (102) is represented by a vector whose elements correspond to respective related concepts, e.g., $C_s = \{c_1, c_2, c_3, \ldots, c_m\}$, as shown in FIG. 1 by the reference 110. Each of the concepts $c_1, c_2, c_3, \ldots, c_m$ in the initial subset $C_s$ 110 (denoted herein by the notation $c_i$) may have a respective weight $w_i$, which is a match score indicative of how well the concept $c_i$ matches or is related to, on a lexical and/or semantic basis, the input candidate term t (102), as returned or provided by the initial semantic analyzer 108. For example, the weight $w_i$ may be indicative of how frequently concept $c_i$ appears within the search space of the corpus C, and/or may be indicative of some other measure of matching.

In an embodiment, the initial semantic analyzer 108 represents the candidate term t (102) as a search query, and the initial semantic analyzer 108 searches a search space of the corpus C based on the candidate term t (102) by utilizing the search index 115, and optionally based on a particular weight threshold or range. The search space may be constrained by the target search field F and/or by other search-limiting parameters, for example. The search may return a weighted set of records $C_s$ 110 (e.g., $c_1, c_2, c_3, \ldots, c_m$, as shown in FIG. 1) that best matches the candidate term t (102), e.g., based on the vector space model utilized by the analytics technique employed by the initial semantic analyzer 108. Formally, $C_s$ may be represented by:

$$C_s = \{(c_i, w_i) : c_i \in C \text{ and } i <= N\}$$

subject to: $\text{title}(c_i) <= \tau, \text{length}(c_i) >= L, |C_s| <= M$      (Equation 1)

when search-limiting parameters τ, L, and M are utilized.

The NLR tool 100 shown in FIG. 1 further includes a concept expander 118 that operates on the initial set of concepts $C_s$ 110 generated by the initial semantic analyzer 108 to generate an expansion set $C_p$ of concepts (reference 120). As illustrated in FIG. 1, the expansion set of concepts $C_p$ 120 includes therein another nm concepts $\{c'_{11}, c'_{12}, c'_{13}, \ldots, c'_{1n}; c'_{21}, c'_{22}, c'_{23}, \ldots, c'_{2n}; \ldots; c'_{m1}, c'_{m2}, c'_{m3}, \ldots, c'_{mn}\}$ from the corpus, each of which is latently related to the input candidate term t (102), and each of which has been discovered or mined using at least some of the mined semantic analysis techniques described herein. A total number of concepts mn included in the expansion set of concepts $C_p$ 120 typically is less than the total number of concepts N of the entire corpus, e.g., mn<=N. As such, the expansion set of concepts $C_p$ 120 is a subset of the corpus C.

To determine, discover, or identify the expansion subset of concepts C, 120 based on the initial set of concepts $C_t$ 105, in an embodiment, the concept expander 118 utilizes a set of concept association rules R (reference 122). At least a portion of the concept association rules R (122) are mined from the corpus or knowledge base C, and typically, the concept association rules R (122) are stored on one or more data storage devices that are accessible to the concept expander 118. For example, as shown in FIG. 1, the concept association rules 122 are included in the NLR tool 100, and are stored on data storage devices that are separate from the data storage devices storing the search index 115. However, in some embodiments, the concept association rules 122 and the search index 115 may be integrally stored, either as part of the tool 100 or at another location that is communicatively connected to the tool 100. In some embodiments, the search index 115 is included in the tool 100 while the concept association rules 122 is excluded from but otherwise communicatively connected to the NLR tool 100, or vice versa.

Figure 2:
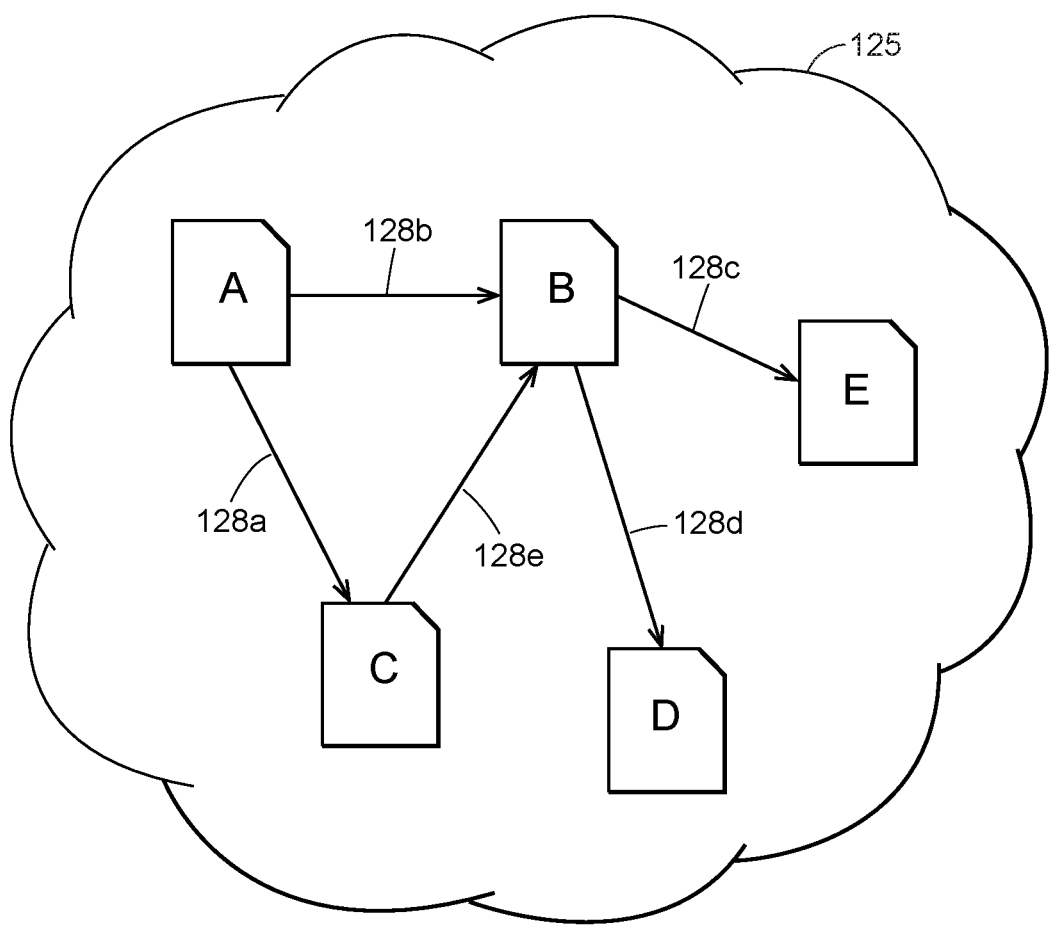
FIG. 2 depicts an example of illustration of the mining of a corpus to generate a set of concept association rules.

FIG. 2 depicts an example illustration of mining of a corpus to generate a set of concept association rules. The techniques for corpus mining discussed with respect to FIG. 2 may be applied to the corpus C to generate the set of concept association rules R (122) of FIG. 1, for example. Corpus mining allows for discovery, learning, and identification of latent relationships between various concepts included in the corpus, as is described below.

In FIG. 2, an example corpus 125 comprises a set of individual corpus units or records, five of which are illustrated, i.e., Records A, B, C, D, and E. As previously discussed, each corpus unit or record generally has a similar format and has a respective base concept, which typically may be represented by a title, a name, or other identifier of the corpus unit or record. Additionally, each corpus unit or record may include therein one or more respective indications of other corpus units or records that are related to the record's base concept. These indications of other corpus units or records that are related to the records base concept and that are included in the record of the base concept are generally referred to herein as "record-links." For example, if the corpus 125 is a set of Wikipedia articles, the other Wikipedia articles listed in the "See also" section of each article may include record-links of the article, as the "See also" section indicates other articles that are related to the base concept of the article. In another example, if the corpus 125 is a set of patents, the cited/considered references indicated in each patent may include record-links of the patent, as the cited/considered references indicate other patents and/or patent publications that are related to the patent. In still another example, if the corpus 125 is a set of journal articles, the list of citations associated with each journal article may include record-links of the journal article, as the list of citations indicate other related journal articles.

It is understood that although the term "record-links" is utilized herein to represent indications of other related records within a particular corpus unit or record, the term "record-links" herein does not imply that said indications necessarily need to take any particular format or formats. For example, a related record may be indicated in a record by a hyperlink; by natural language, including flat text, numbers, combinations of alphanumeric characters, etc.; by a footnote; or by any other suitable indicator. Further, the record-links of a record need not be all of a similar format, and need not be consolidated or located in one particular section of a record. For example, if the corpus 125 is a set of patents, the record-links of a particular patent may include the cited references on the face page of the patent, as well as indications, within various other sections of the patent specification, of other patents, publications, and/or applications that have been incorporated by reference into the patent. In another example, if the corpus 125 is a set of Wikipedia articles, the record-links of a particular Wikipedia article may include the citations in the "See also" section of the article as well as any hyperlinks that are utilized within the body of the article.

Indeed, record-linkage within the corpus C may be discovered by using any one or more record-linkage discovery and/or mining techniques. Such record-linkage discovery and/or mining techniques may include explicit techniques that are directly applied to the corpus C, such as the example techniques described above that identify indications of references within records (e.g., "See also" references, cited references, citations, etc.), syntactic parsing of the text within corpus records, applying citation network analysis on the corpus, etc. Additionally or alternatively, record-linkage discovery and/or mining techniques may include implicit techniques such as incorporating other established relationships from other knowledge graphs (e.g., DBPedia and the like), and/or other implicit techniques.

At any rate, each corpus unit or record may explicitly and/or implicitly indicate therein one or more record-links, e.g., one or more indications of other corpus units or records whose base concepts are related to the record's base concept. Each record within the corpus 125 is mined to determine the record-links to other records that are indicated therein to discover latent concepts that are related to the record. For example, as shown in FIG. 2, Record A indicates Record C therein, and as such includes a record-link to Record C (as denoted by the arrow 128a). Record A also indicates Record B therein, and as such also includes a record-link to Record B (as denoted by the arrow 128b). Record B references both Records E and D therein, and as such is record-linked to both Records E and D (as denoted by the arrows 128c and 128d, respectively). Record C indicates Record B therein, and thus is linked to Record B (as denoted by the arrow 128e). It is noted that while FIG. 2 illustrates unidirectional record-links, the techniques described herein may be equally applied to multidirectional record-links, in some embodiments.

Formally speaking, a corpus includes a set of concepts $C=\{c_1, c_2, c_3, \ldots, c_N\}$ of size N. From the record-links included in the corpus records corresponding to the concepts $c_i$, a dictionary of transactions $T=\{t_1, t_2, t_3, \ldots, t_M\}$ of size M is built, where M<=N. Each transaction $t_i$ included in T contains a subset of the concepts C that have been constructed or determined based on each concept $c_i$ of C that includes at least one record-link within its corresponding corpus record. That is, each transaction $t_i$ indicates its corresponding base concept $c_i$ and each concept that is record-linked to the record of $c_i$. For example, if a record $c_1$ includes therein record-links to concepts $\{c_2, c_3, \ldots, c_n\}$, a transaction $t_{c1}=\{c_1, c_2, c_3, \ldots, c_n\}$ corresponding to the record $c_1$ is constructed or determined and added to T. Thus, referring to Records A, B, C, and D in FIG. 2 to illustrate, the dictionary of transactions T for the corpus 125 includes $t_A=\{A, B, C\}$, $t_B=\{B, D, E\}$, and $t_C=\{C, B\}$.

In the above example, the concepts $\{c_2, c_3, \ldots c_n\}$ may be considered to be "first-degree" latent concepts of the concept $c_i$. Second-degree latent concepts of the concept $c_i$ may also be determined, if desired, by mining the records of the first-degree latent concepts for record-links included therein. The base concepts of the records indicated by the record-links mined from the records of the first-degree latent concepts thus may be second-degree latent concepts of the concept $c_i$, and may be included in the transaction $t_i$. In a similar manner, n-degree latent concepts of the concept $c_i$ may be discovered and included in the transaction $t_i$.

After the corpus C has been mined to discover the transactions t included therein, and transaction dictionary T has been constructed therefrom, the dictionary T is mined to determine or create a set of concept association rules R. In an embodiment, each concept association rule r included in R may be defined as:

$$r(s,f)=\{(X=>Y):X,Y \subseteq \text{ and } X \cap Y=\emptyset\} \quad \text{(Equation 2)}$$

where both X and Y are subsets of concepts in C. Each concept included in the subset of concepts X is referred to as an antecedent of the rule r, and each concept included in the subset of concepts Y is referred to as a consequence of the rule r. As seen in Equation 2, the rule r is parameterized by two parameters: (1) the parameter s, which represents the support for the rule r (e.g., how many times both X and Y appeared together in T), and (2) the parameter f, which represents the confidence of the rule r (e.g., s divided by the number of times X appeared in T).

In some embodiments, the size of the set of concept association rules R may be limited based on one or more rules-limiting parameters, e.g., to provide more control over participating rules when concept expansion is performed by concept expander 118. One example of such a rules-limiting parameter is a number of concepts included in the consequences set Y, e.g., the absolute value of Y, or formally, |Y|. Another rules-limiting parameter may define a minimum rule support $\epsilon$ which defines a minimum strength of the association between various rule concepts. For example, if the minimum rule support $\epsilon=2$, then all rules r whose support $s>=2$ will be considered during the concept expansion phase. Yet another rules-limiting parameter may be a minimum confidence threshold $\nu$ which defines a minimum strength of the association between rule concepts as compared to other rules with the same antecedents. For example, if $\nu=0.5$, then all rules r whose confidence $f>=0.5$ will be considered during the concept expansion phase. That is, when $\nu=0.5$, consequence concepts must have appeared in at least 50% of the times in which antecedent concepts appeared in T. Of course, rules-limiting parameters are not limited to those described above, but may additionally or alternatively include other types of rules-limiting parameters.

Returning now to FIG. 1, the concept association rules 122 may include a set of rules R that have been mined from the corpus C, and specifically, mined from the transaction dictionary T of the corpus C. The concept expander 118 may apply the association rules R (or a subset thereof) to the initial subset of concepts $C_s$ 110 to generate the set of expansion concepts $C_p$ 120. Specifically, the concept expander 118 may search or mine the rules R for the respective, associated set of concepts for each concept c included in $C_s$ 110. That is, referring to FIG. 1, using the set of association rules R (122), the concept expander 118 operates on concept $c_1$ of $C_s$ 110 to determine the vector $\{c'_{11}, c'_{12}, \ldots, c'_{1n}\}$ of $C_p$ 120, the concept expander 118 operates on concept $c_2$ of $C_s$ 110 to determine the vector $\{c'_{21}, c'_{22}, \ldots, c'_{2n}\}$ of $C_p$ 120, and so on. As such, the expansion subset of concepts $C_p$ 120 is determined or discovered based on mining the corpus C for latent concepts associated with each of the initial concepts $C_s$ 110. Thus, the set of concept association rules R are utilized to mine the corpus C for concept-to-concept associations of the candidate term t based on the initial subset of concepts $C_s$ 110. In some scenarios, the set of concept association rules R is limited by a support threshold and/or a confidence threshold.

Formally, the expansion subset of concepts $C_p$ 120 may be obtained or determined by $$C_p = \bigcup_{c \in C_s, c' \in C} \{(c', w) : \exists\, r(s, f) = c \Rightarrow c'\} \quad \text{(Equation 3)}$$

subject to: $|c'| = |Y|$, $s >= \epsilon$, $f >= \nu$ when rules-limiting parameters $\epsilon$ and $a$ are utilized, where c' represents concepts that are implied by c, e.g., c' are the discovered or mined latent concepts of c. Note that, in Equation 3, all concepts c' that are implied by c and that meet the support threshold $\epsilon$ and the confidence threshold u are included in $C_p$ 120. Additionally, in this embodiment, each implied concept c' inherits the respective weight w of its respective concept c, however, this is only one possible approach for assigning weights to implied concepts c'. For example, in other embodiments, the particular respective weight w' of each implied concept c' may be particularly determined.

As described above, the expansion subset of concepts $C_p$ 120 of the corpus C may be determined based on applying a set of concept association rules R to the initial subset of concepts $C_s$ 110, where the concept association rules R are determined based on a transaction dictionary T of the corpus. However, this is only one of many embodiments and/or techniques for discovering or mining for expansion concepts. For example, in some embodiments, the expansion subset of concepts $C_p$ 120 may be determined, discovered, or mined from the corpus C based on co-occurrence (such as explicit, keyword co-occurrence based representation), LSA, or any one or more other semantic analysis techniques, e.g., with respect to the initial set of concepts $C_s$ 110.

As shown in FIG. 1, the NLR tool 100 includes a concept space generator 130. The concept space generator 130 operates on both the initial subset of concepts $C_s$ 110 and the expansion subset of concepts $C_p$ 120 to generate the concept space $C_t$ 105 of the input candidate term t (102). In an embodiment, the concept space generator 130 determines the concept space $C_t$ 105 of the candidate term t (102) by merging the initial subset of concepts $C_s$ 110 and the expansion subset of concepts C, 120, e.g., $$C_t = C_s \cup C_p \quad \text{(Equation 4)}$$

That is, the initial subset of concepts $C_s$ 110 is augmented with the expansion subset of concepts $C_p$ 120 to generate or create the concept space $C_t$ 105 of the input candidate term t (102). Accordingly, the concept space $C_t$ 105 of the candidate term t (102) includes both (i) at least a portion of the subset $C_s$ 110 of concepts within the corpus C that are determined through direct or indirect semantic analytic techniques, and (ii) at least a portion of the subset $C_p$ 120 of concepts that are latently related to the candidate term t (102) and that are determined/discovered via mining of the concept space C and its transaction dictionary T.

In some configurations, the concept space generator 130 provides the concept space $C_t$ 105 of the candidate term t (102) to an output of the NLR tool 100 (not shown in FIG. 1). In some configurations, the concept space generator 130 provides the concept space $C_t$ 105 of the candidate term t (102) to a relatedness scorer 135, as is illustrated in FIG. 1. The relatedness scorer 135 of the Natural Language Relatedness tool 100 is configured to determine a deterministic measure of relatedness between two or more candidate terms. As such, for a pair of candidate terms $(t_1, t_2)$, the relatedness scorer 135 may deterministically measure the similarity (reference 138) between their respective concept spaces $(C_{t1}, C_{t2})$.

In an example scenario, each of the candidate terms $t_1, t_2$ is respectively input (reference 102) into the NLR tool 100, and their respective concept spaces $C_{t1}, C_{t2}$ are generated (reference 105). In an embodiment, the relatedness scorer 135 may sparsify the vectors that represent the concept spaces $C_{t1}$ and $C_{t2}$ to have the same length, if desired. To determine a relatedness score for the two candidate terms $(t_1, t_2)$, the relatedness scorer 135 may apply a cosine similarity measure (or other suitable equivalent technique) to the respective weight vectors $(W_{t1}, W_{t2})$ of the concept space vectors $(C_{t1}, C_{t2})$, e.g.:

$$Rel_{cos}(t_1, t_2) = \frac{W_{t_1} \cdot W_{t_2}}{\|W_{t_1}\| \|W_{t_2}\|} \quad \text{(Equation 5)}$$

In scenarios in which the concept spaces $(C_{t1}, C_{t2})$ are sparsified, the relatedness scorer 135 may compensate or adjust for the sparsity by applying a normalization factor $\lambda$, e.g.:

$$Rel(t_1, t_2) = \begin{cases} 1 & Rel_{cos}(t_1, t_2) \geq \lambda \\ \frac{Rel_{cos}(t_1, t_2)}{\lambda} & Rel_{cos}(t_1, t_2) < \lambda \end{cases} \quad \text{(Equation 6)}$$

Accordingly, in FIG. 1, the relatedness scorer 135 of the NLR tool 100 deterministically measures or determines the relatedness 138 between the candidate terms $(t_1, t_2)$ based on their concept spaces $C_{t1}, C_{t2}$, and provides a deterministic, meaningful value that is more accurate than known term-space relatedness measures, at least because latent concepts related to the candidate terms $(t_1, t_2)$ have been discovered and are taken into consideration. That is, the NLR tool 100 is able to capture domain-specific latent knowledge and utilize the captured latent knowledge in addition to explicit and/or implicit knowledge to generate a more accurate and interpretable relatedness score or measure 138.

Figure 3A:
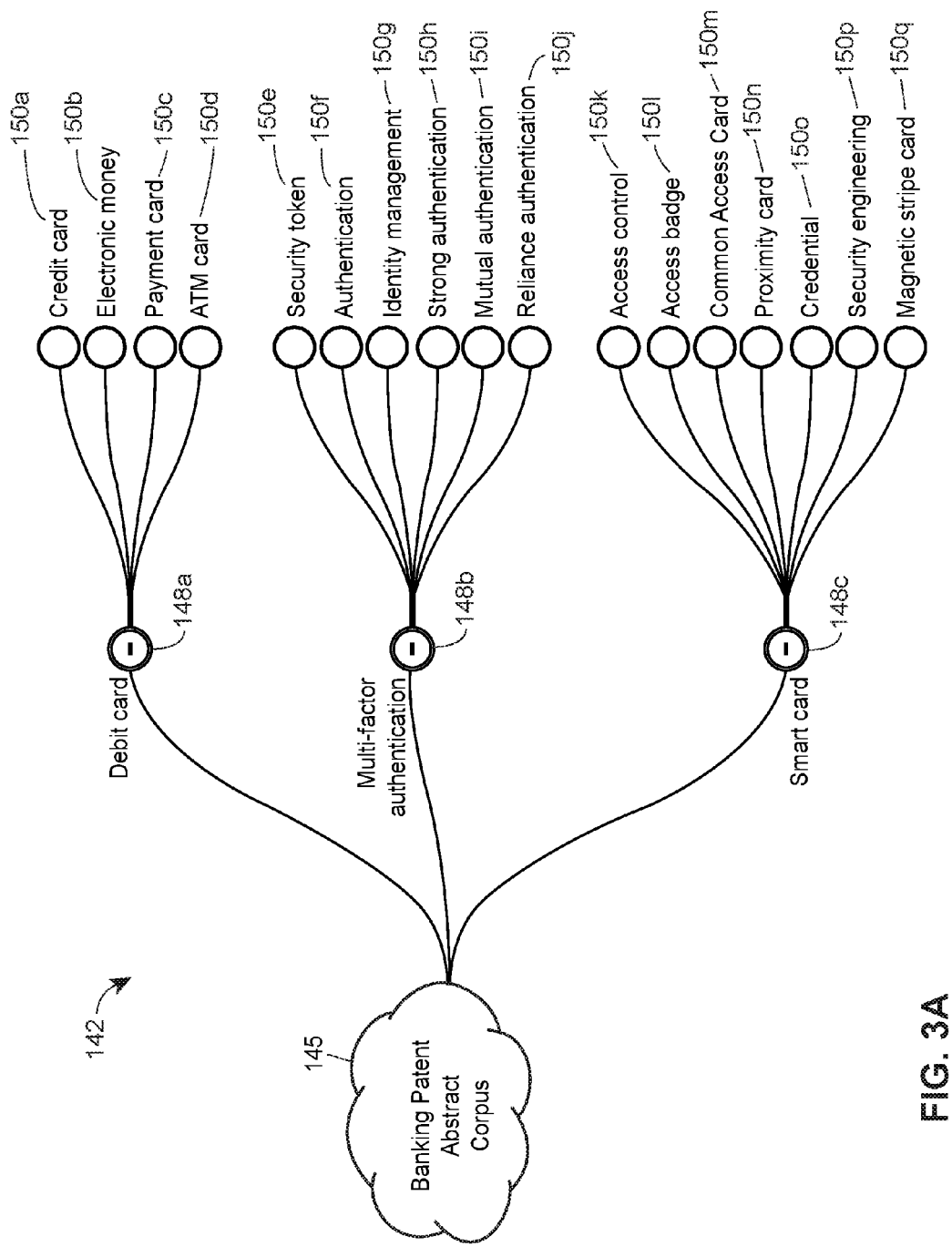
FIG. 3A illustrates a sample concept space discovered by an NLR tool using MSA techniques.

FIG. 3A illustrates a representation of a sample concept space 142 generated by the NLR tool 100 by applying one or more of the Mined Semantic Analysis techniques described herein to a corpus 145 consisting of the abstracts of ten United States patents owned by a financial company. The ten abstracts 145 were provided as input into the NLR tool 100, which consequently determined, by using an Explicit Semantic Analysis technique, that the concepts "debit card" 148a, "multi-factor authentication" 148b, and "smart card" 148c were the concepts within the corpus that were the most strongly explicitly-related to or associated with the ten patent abstracts. Subsequently, each of the explicitly-associated concepts 148 was mined to discover respective latent concepts 150 of the corpus 145. For example, the latently-associated concepts "credit card" 150a, "electronic money" 150b, "payment card" 150c, and "ATM card" reference 150d were derived from the explicitly-associated concept "debit card" 148a. Similarly, the latently-associated concepts 150e-150j were derived from the explicitly-associated concept "multi-factor authentication" 148b, and the latently-associated concept 150k-150q were derived from the explicitly-associated concept "smart card" 148c. Further, in the concept map 142, each concept 148x, 150x is represented by a circle, and its type of association with the corpus 145 (e.g., explicitly-derived or latently-discovered) is represented by a particular color. The derivations of the associations are indicated in the concept map 142 by interconnecting lines between concept circles. Of course, this tree arrangement is only one of many suitable representations of the concept space 142 and the associations of various concepts included therein.

Figure 3B:
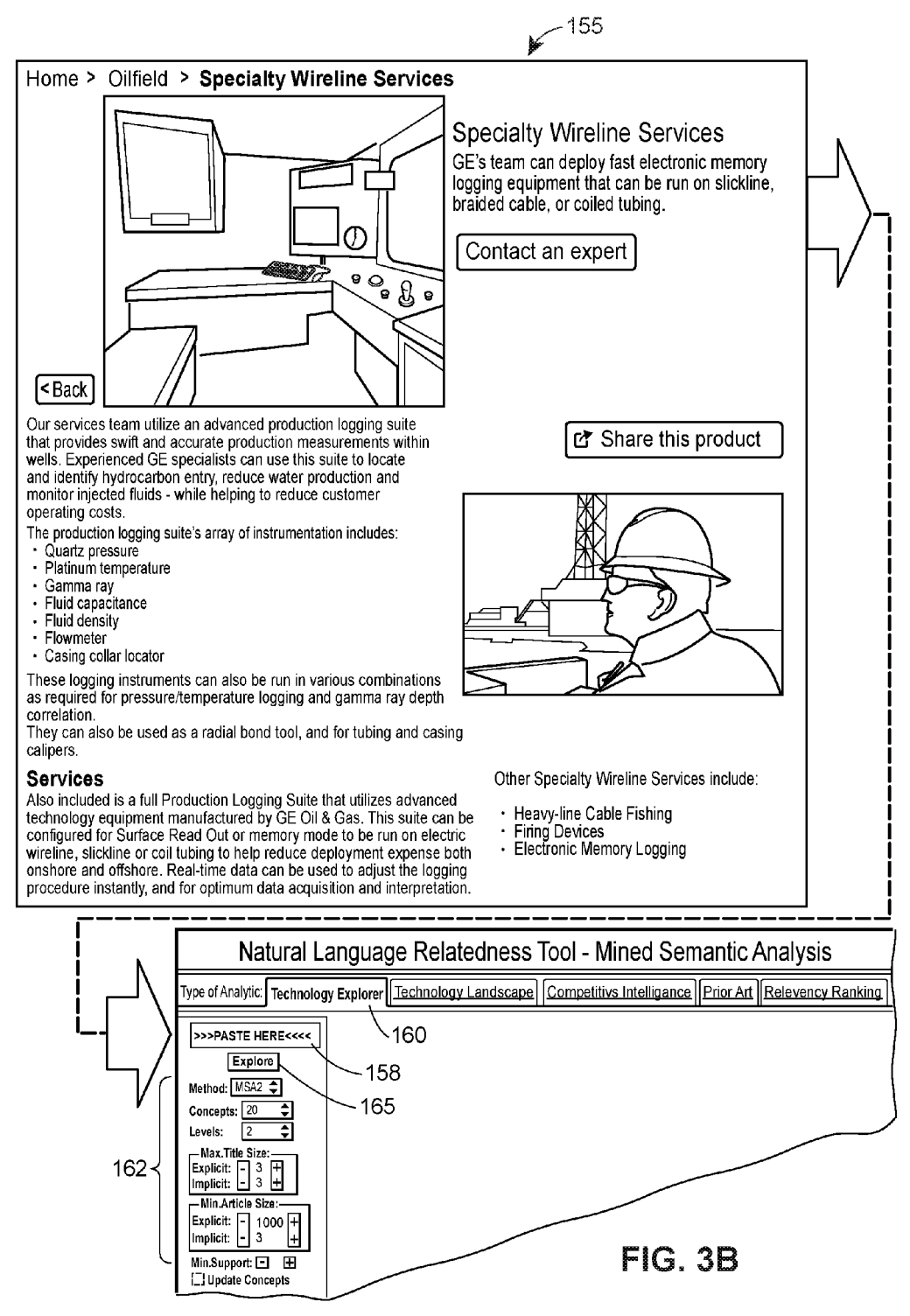
Figure 3C:
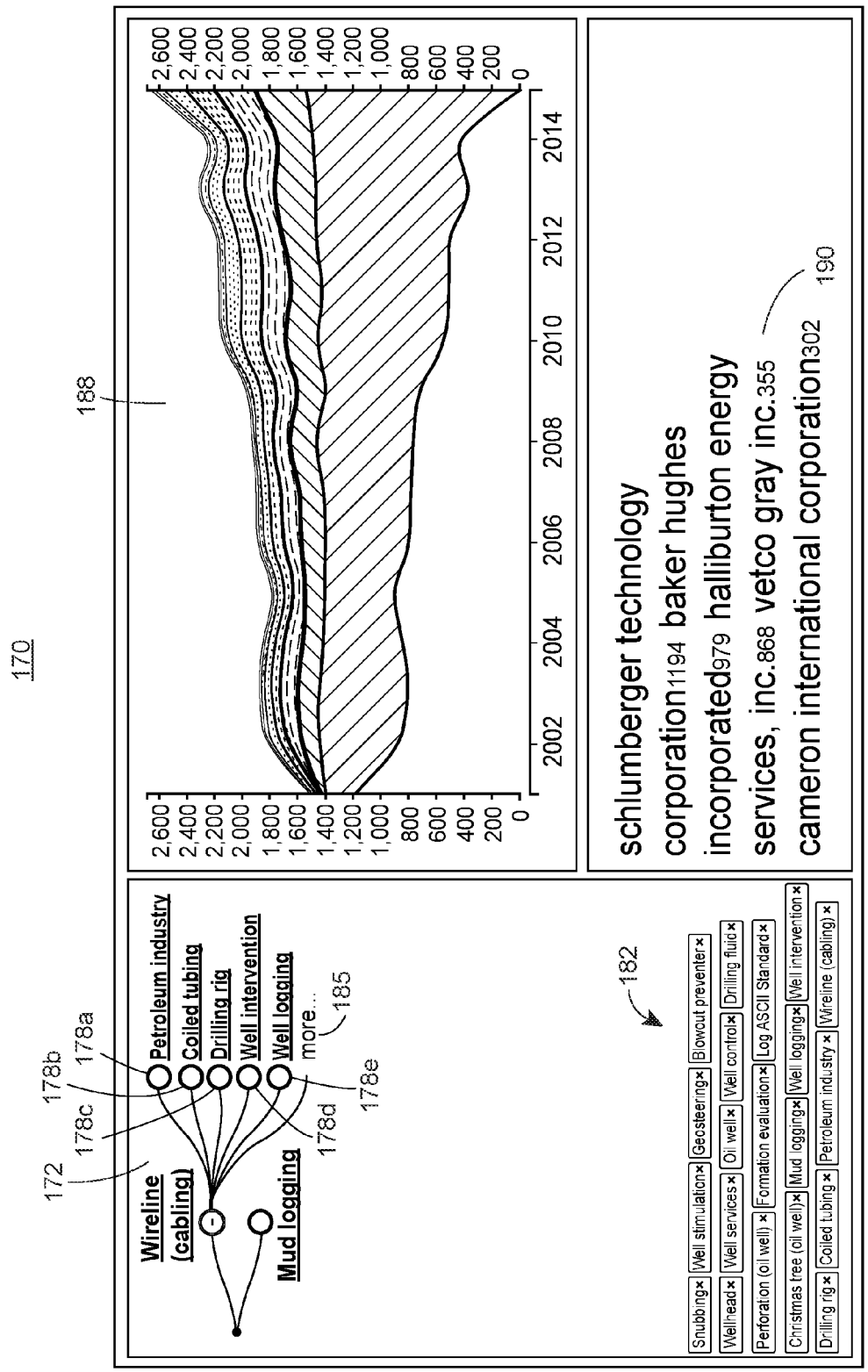
Figure 3D:
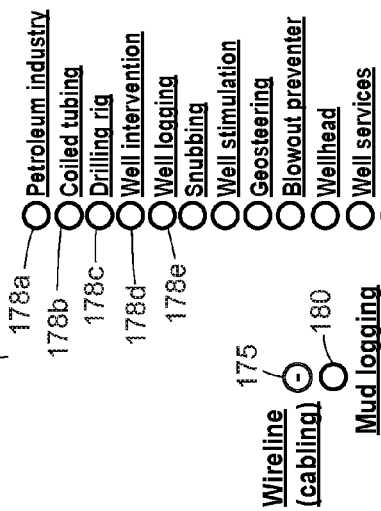

FIGS. 3B-3D illustrate an example scenario in which the Natural Language Relatedness tool 100 is utilized to discover knowledge, contained within a corpus of United States patents and patent publications, that is related to or associated with the natural language content of a particular webpage 155, i.e., https://www.geoilandgas.com/oilfield/logging-services/specialty-wireline-services, which was accessed on Jun. 16, 2016. The corpus includes 15 million records, including Wikipedia articles as well as patent and grant data from the United States Patent and Trademark Office. As illustrated in FIG. 3B, a user is able to cut and paste the content of the webpage 155 into an input field 158 of a Technology Explorer screen 160 of the NLR tool 100 displayed on a user interface. Additionally, on the Technology Explorer screen 160, the user is able to select or enter various parameter values 162 to control the search or exploration of the corpus, e.g., the method is set to "MSA2" (which indicates searching for second-degree latent concepts, whereas "MSA1" would indicate searching for first-degree latent concepts, for example), a number of initial concepts to return and display is set to 20, a number of levels or degrees of association to explore is set to 2, and maximum title and minimal article sizes are indicated, as well as a minimum of level of support. After the candidate input term 155 and parameter values 162 are provided, the user activates a control 165 to cause the tool 100 to execute to discover knowledge within the corpus of patents and patent publications that are most strongly related to or associated with the natural language input 155.

FIG. 3C illustrates a portion of the knowledge 170 that is discovered by the tool 100 operating on the input 155 and that has been displayed on the user interface. Generally speaking, the discovered knowledge comprises information that is contained within the corpus and discovered by the tool 100 as being related to the candidate natural language input 155, as well as respective, deterministic measures of relatedness of various portions of the knowledge with respect to the candidate natural language input 155. As shown in FIG. 3C, the discovered knowledge 170 includes a tree representation 172 of a portion of the concept space of the input 155. In particular, the tree representation 172 indicates a discovered concept "wireline (cabling)" 175a that is explicitly associated with the input 155 and a set of other discovered concepts 178a-178e that were determined by the tool 100 to be latently associated with the input 155 based on the concept 175a. The tree representation 172 also indicates another discovered, latently-associated concept "mud logging" 180 which is indicated as not being derived from an explicitly associated concept. Other concepts that were discovered but are not displayed in the tree graph 172 are indicated in another area of the user interface 182 by their concept names. A user may adjust or explore the tree graph 172 as he or she desires, e.g., by expanding how much of the tree 172 is displayed via the user control 185, by dragging and dropping indications of desired concepts from the area 182 to the tree graph 172, by pruning away or deleting indications of concepts (either from the area 182 or from the tree graph 182) that he or she has no interest in, etc.

Thus, as shown in FIGS. 3A-3C (and also as will be seen in FIG. 3D), the NLR tool 100 has an ability to receive an arbitrary piece of natural language text (e.g., via the input field 185), and generate therefrom a representation of a set of concepts, from a corpus, that correspond to the input natural language text in a graph format (e.g., in a concept graph 172). The concept graph indicates not only the discovered set of concepts but also indicates their respective, deterministically determined strengths of relatedness to the input, as well as the concepts' interrelationships and derivations. Accordingly, the concept graph 172 provides a semantically meaningful representation of the discovered concepts corresponding to the input natural language text. Moreover, as also shown in FIGS. 3A-3D, with the NLR tool 100, the generation or creation of the concept graph 172 is unsupervised and/or automatic. That is, with the NLR tool 100, the generation or creation of the concept graph 172 excludes any human input aside from the initial provision of the input natural language text.

Returning now to FIG. 3C, in addition to the concept graph 172, other discovered knowledge 170 from the corpus that corresponds to the candidate natural language input 155 may be automatically generated and represented in other formats, such as in a stream graph 188. The stream graph 188 illustrates how areas of technology related to the candidate natural language input 155 (as represented by underlying patent class-codes included in the patents and patent publications of the corpus) have evolved over time. In the stream graph 188, the x-axis corresponds to time, and the y-axis corresponds to counts of patents and patent publications per patent class code. Additionally, each patent class code is distinguished by a different band of color. A user may explore the stream graph 188, for example, by clicking on a band of color at a certain date to find out the respective patent class code and respective patents/patent publications corresponding thereto, by filtering by certain concepts or company names, etc.

As further shown in FIG. 3C, still other discovered knowledge 170 from the corpus that corresponds to the candidate natural language input 155 may include a list of companies 190 that have intellectual property associated with the candidate natural language input 155. The number of patents and/or patent publications of each company that have been discovered as being relevant to the candidate natural language input 155 is indicated by the respective numerical subscripts, but may additionally or alternatively be indicated on the other visual manners and formats, such as by the size of the text used in displaying the name of the company, by bubble charts, etc.

FIG. 3D illustrates an expansion of the tree graph 172 shown in FIG. 3B after the user has activated the user control 185. Additionally, in another area 195 of the user interface, FIG. 3D also illustrates additional discovered knowledge, e.g., portions of discovered patents and patent publications from the corpus that are the most relevant to the displayed tree graph 172. Note that the concepts indicated within the tree graph are emphasized within the text of displayed snippets of the relevant patents and patent publications 195. A user may be able to narrow and/or expand the list of indicated patents and patent publications 195 by manipulating the concepts that are displayed or pruned from the tree graph 172, or by otherwise providing a user input to modify at least a part of the tree graph 172. Of course, a user may be able to explore the discovered relevant patents and patent publications 195 in other manners as well, such as by filtering, ordering, searching, sorting, etc. based on any number of aspects, such as company name, patent code-class, determined measure of relatedness, date, and the like.

Generally speaking, after entering an initial query into the NLR tool 100 (e.g., via the input field 158) and receiving knowledge results 170 therefrom (such as via the tree graph 172 and/or other result information displayed on other portions of the screen, for example, as denoted by references 188, 190, 192, 195), the user may interact with the initial representation of the knowledge results 170 to refine his or her initial query. For example, the user may manipulate and/or edit portions of the tree graph 172, thereby automatically triggering the NLR tool 100 to operate accordingly on the concept space $C_t$ and/or on the corpus C. Consequently, a user may perform natural language query or search expansion, reduction, and/or refinement simply by manipulating, editing, or otherwise indicating a desired modification or change to the concept graph 172, and/or by providing additional or alternative natural language text as input based on the concept graph 172. Additionally or alternatively, a user may indicate one or more modifications to other portions of the initial knowledge results 170, which may automatically trigger the NLR tool 100 to operate accordingly on the concept space $C_t$ and/or on the corpus C. As such, the NLR tool 100 provides a human-in-the-loop retrieval approach to searching that includes iterative and interactive modes of operation, and further, the NLR tool 100 provides a multi-stage search capability that allows a user to search at varying levels of abstraction as he or she desires while exploring the concept space of natural language text that he or she has provided.

Accordingly, in view of the above, the Natural Language Relatedness tool 100 may support an exploratory mode in which a user is able to explore knowledge contained within a corpus that is discovered by the tool 100 as being related to or associated with a candidate natural language input provided by the user. For example, exploratory mode of the tool 100 may provide interactive concept exploration, concept tagging and annotation, etc. Furthermore, additionally or alternatively, the NLR tool 100 may support a predictive mode in which lexical and/or semantic similarity between various candidate terms may be evaluated. The discovered and measured similarities may be utilized to classify and cluster various candidate terms, thereby enabling predictive analysis techniques to be applied.

As such, the Natural Language Relatedness tool 100 and/or the MSA techniques described herein may be utilized in many different useful applications. For example, via the tool 100 and/or MSA, a user may conduct a semantic search whose results are more accurate and measurable than those that are generated by currently known semantic analysis techniques. Additionally, a user may utilize the tool 100 and/or MSA techniques to understand conceptual landscapes of a domain or corpus (e.g., of intellectual property, of marketable products and/or services, of health-care topics and/or services, etc.), to understand a competitive landscape, to identify white-spaces of a domain, and more. Examples of different applications of MSA techniques are indicated by the various selectable tabs that allow a user to view different types of discovered knowledge in different formats and representations (e.g., Technology Explorer 160, Technology Landscape, Competitive Intelligence, Prior Art, Relevancy Ranking). Of course, the applications indicated in FIG. 3A are exemplary only, and are not meant to be a limiting set of applications.

Moreover, the Natural Language Relatedness tool 100 may be tuned and/or updated manually and/or automatically over time. For example, the inclusion of additional corpus records and/or of additional corpora may be utilized to tune the tool 100. Additionally or alternatively, the NLR tool 100 may automatically learn from how users select, prune, add to, and otherwise interact with discovered knowledge over time, and the tool 100 may utilize this learned knowledge to refine its knowledge discovery techniques and the accuracy of relatedness measurements.

Indeed, the mined semantic analysis (MSA) techniques utilized by the Natural Language Relatedness tool 100 provide significant benefits and advantages over known semantic analysis techniques. For example, MSA techniques provide results that are more correlated as compared to results generated by using known direct semantic analysis techniques such as ESA, SSA, and NASARI. This makes sense, as the correlation results generated by the NLR tool 100 are produced based on both (i) an initial set of concepts obtained from explicit mentions and direct associations within a corpus, whether explicitly or implicitly obtained (e.g., $C_s$ 110 of FIG. 1), and (ii) an expansion subset of concepts obtained from mining the corpus for latent concepts associated with the initial set of concepts (e.g., the concept-concept associations $C_p$ 120 of FIG. 1).

Furthermore, MSA techniques provide results that are more interpretable and deterministic as compared to results generated by known indirect or implicit semantic analysis techniques such as LSA, LDA, Word2Vec, etc. For example, LSA operates by mapping a term-document co-occurrence matrix from a textual, term-based space into a new, meaning-based space by using singular-value decomposition. However, in the new, computed space it is difficult, if not impossible, to represent relatedness results in an interpretable manner, at least due to the difficulty in mapping the results generated in the meaning-based space back into terms or concepts of the term-based space. Additionally, the LSA technique assumes that each word or term is a unigram that has one and only one meaning. As such, for a word or term that has multiple meanings (for example, the aforementioned example term "thread"), a different LSA would need to be run for each different meaning of the word or term. Similarly, for a term or phrase that is an n-gram, where n is an integer greater than one, n different LSAs would need to be run to generate comprehensive results for the target n-gram.

On the other hand, the MSA techniques utilized by the NLR tool 100 inherently handle both terms that have multiple meanings and terms that comprise multiple grams. As such, the MSA techniques need only be run once on a candidate term to comprehensively discover associated concepts of the different meanings of the term and associated concepts of the differently-sized grams of which the candidate term is comprised.

In another example, LDA techniques generally operate on a larger portion of text, such as a document, and distributively determine the topics or concepts included therein. In doing so, LDA assumes that each document is a mixture of a small number of topics, and that each word included in the document is attributable to one of the document's topics. As such, unlike MSA, LDA is not able to granularly operate on smaller semantic units, such as words, terms, or phrases. Further unlike MSA, LDA is not able to discover latent associations between words, terms, phrases, or even topics.

Indeed, as shown in FIGS. 4A and 4B, the benefits and advantages of Mined Semantic Analysis over known semantic analysis techniques were demonstrated in a benchmarking comparison of MSA against several other known semantic analysis techniques using the standard benchmark data sets:

"RG", a similarity dataset created by H. Rubenstein and J. B. Goodenough, "Contextual Correlates of Synonymy," *Commun. ACM*, vol. 8, pp. 627-633, October 1965;

"MC", a similarity dataset created by G. A. Miller and W. G. Charles, "Contextual Correlates of Semantic Similarity," *Language and Cognitive Processes*, vol. 6, no. 1, pp. 1-28, 1991;

"WS", a relatedness dataset created by L. Finkelstein, E. Gabrilovich, Y. Matias, E. Rivlin, Z. Solan, G. Wolfman, and E. Ruppin, "Placing Search in Context: The Concept Revisited," *Proceedings of the 10th International Conference on World Wide Web*, pp. 406-414, ACM, 2001; and "WSS" and "WSR", a manual split of the WS dataset into two subsets to separate between similar related pairs, created by E. Agirre, E. Alfonseca, K. Hall, J. Kravalova, M. Paş ca, and A. Soroa, "A Study on Similarity and Relatedness using Distributional and Wordnet-based Approaches," *Proceedings of Human Language Technologies: The 2009 Annual Conference of the North American Chapter of the Association for Computational Linguistics*, pp. 19-27, Association for Computational Linguistics, 2009.

In the benchmarking comparison, two sets of experiments were performed. In the first set of experiments, MSA was evaluated with different combinations of parameters to get the maximum performance combination on each data set. In the second set of experiments, MSA was evaluated in a setting in which one of the data sets was used as a development set for tuning MSA's parameters, and then the tuned parameters were used to evaluate MSA's performance on the other datasets. In both sets of experiments, parameters were set to $|Y|=1$; F=entire content of record; and $v=0.0$. The search index was built using a corpus of English Wikipedia articles obtained in March, 2015, and the total uncompressed XML dump size was about 52 GB, representing about 7 million articles. After extraction and pruning, the search index contained about 4.8 million documents in total. The "See also" sections of the Wikipedia articles were mined to determine record-links for each article.

The results of the benchmark comparison were determined by measuring the correlation between MSA's computed relatedness scores (e.g., $Rel(t_1, t_2)$ of Equation 6) with the gold standard provided by human judgments. MSA's correlation scores were compared with those of other known semantic analytics techniques such as:

LSA, SSAs, and SSAc, from S. Hassan and R. Mihalcea, "Semantic Relatedness using Salient Semantic Analysis," *AAAI*, 2011;

CW and BOW, from aforementioned Agirre, et al.;

NASARI, using pairwise similarities from J. Camacho-Collados, M. T. Pilehvar, and R. Navigli, "Nasari: A Novel Approach to a Semantically-Aware Representation of Items," *Proceedings of NAACL*, pp. 567-577, 2015;

ADW, from M. T. Pilehvar and R. Navigli, "From Senses to Texts: An All-in-One Graph-based Approach for Measuring Semantic Similarity," *Artificial Intelligence*, vol. 228, pp. 95-128, 2015;

GloVe, from J. Pennington, R. Socher, and C. D. Manning, "GloVe: Global Vectors for Word Representation," *Proceedings of the Empirical Methods in Natural Language Processing (EMNLP* 2014), vol. 12, pp. 1532-1543, 2014; and Word2Vec$_t$ and Word2Vec$_x$, from M. Baroni, G. Dinu, and G. Kruszewski, "DonâAZt count, predict! A Systematic Comparison of Context-counting vs. Context-predicting Semantic Vectors," *Proceedings of the 52nd Annual Meeting of the Association for Computational Linguistics*, vol. 1, pp. 238-247, 2014.

Dataset MC was utilized as the development set for tuning MSA's parameters and evaluating performance on the other datasets using the tuned parameters. The parameter values obtained by tuning on the dataset MC were L=5 k, M=500, τ=3; and ε=1. Both Pearson (r) correlation scores and Spearman (φ) correlation scores were obtained, and are reproduced in table 196 of FIG. 4A and in table 197 of FIG. 4B, respectively.

Turning first to FIG. 4A, table 196 illustrates that, in absolute numbers or figures, the MSA$_x$ technique consistently produced higher Pearson correlation scores than those produced by other explicit semantics approaches like ESA, SSA, and NASARI. Further, MSA's Pearson correlation scores were also higher than those produced by predictive models built using deep learning like Word2Vec. In FIG. 4B, table 197 illustrates that MSA produced the highest Spearman correlation scores on two data sets, MC and WSR. Additionally as illustrated in table 197, results from the other data sets were very competitive in absolute numbers or figures. For example, MSA generated higher Spearman correlation scores than GloVe and Word2Vec on the RG dataset.

Generally speaking, the experimental testing results illustrate the superior performance of MSA over known semantic analytic models for measuring semantic relatedness. Further, as MSA allows for optimization of the concept space construction, domain-specific performance may produce significantly higher correlation scores. Moreover, the MSA tool 100 provides additional benefits by having the ability to capture multiple meanings of multi-gram inputs in a single execution or run.

Figure 5:
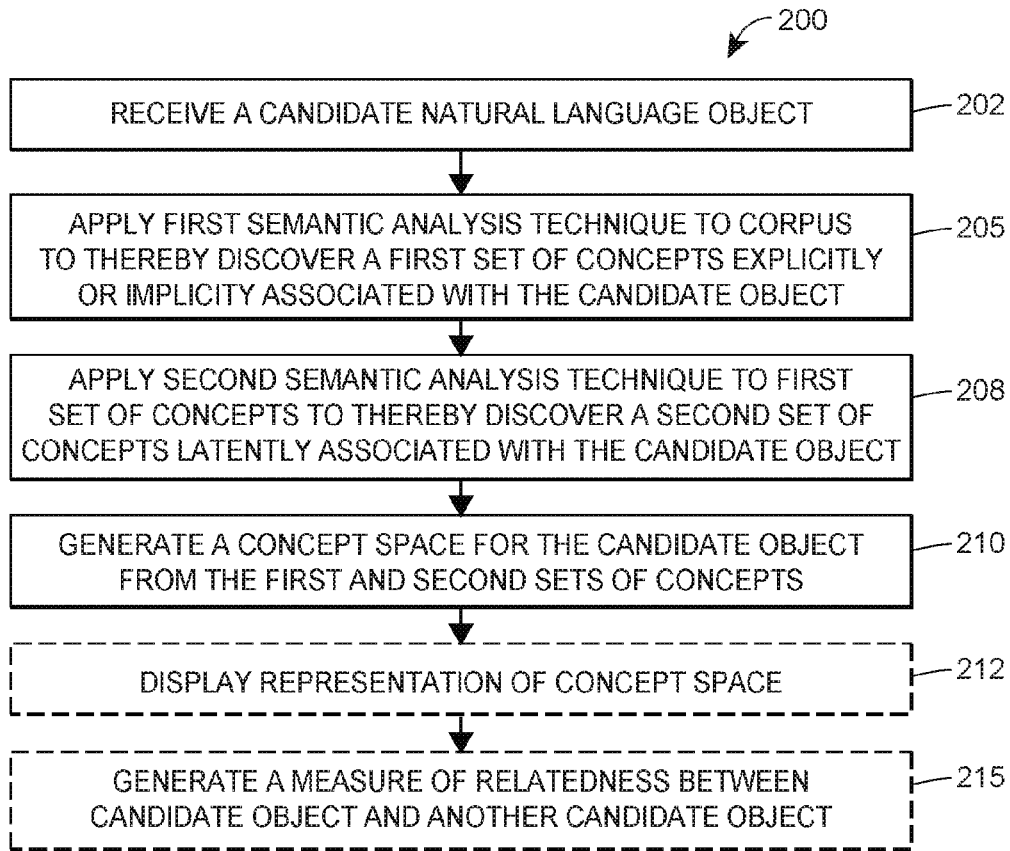
FIG. 5 depicts a flow chart of an example method for generating or discovering a concept space, within a corpus including natural language, of a candidate natural language term.

Referring now to FIG. 5, FIG. 5 depicts a flow chart of an example method 200 for generating a concept space, within a corpus comprising natural language, of a natural language object. At least a portion of the method 200 may be performed, in some embodiments, by one or more parts of the NLR tool 100 of FIG. 1. For example, at least a portion of the method 200 may be performed by the initial semantic analyzer 108, the concept expander 118, and/or the concept space generator 130 of the tool 100. Of course, one or more portions of the method 200 may be performed by other natural language processing tools or systems, however, for ease of discussion and not for limitation purposes, the method 200 is described with simultaneous reference to the NLR tool 100 of FIG. 1.

With respect to the method 200, the corpus may comprise a plurality of corpus units or records, each of which corresponds to a respective base concept of the corpus. For example, the corpus may be the corpus C described with respect to FIG. 1, or the corpus may be the corpus 125 shown in FIG. 2.

At a block 202, the method 200 includes receiving a candidate object. The candidate object may comprise one or more natural language words, terms, phrases, etc. For example, the candidate object may be the candidate term t received at the input 102 of the NLR tool 100.

At a block 205, the method 200 includes applying a first semantic analysis technique to the corpus based on the received candidate object to discover a first set of concepts within the corpus, each of which is explicitly or implicitly associated with the candidate object. Each concept included in the first set of concepts comprises a respective one or more natural language terms, and each concept included in the first set of concepts may be explicitly or implicitly associated with the candidate object, e.g., as determined by the first semantic analysis technique. For example, the determination of whether or not a concept of the corpus is explicitly or implicitly associated with the candidate object may be determined based on explicit mentions of the candidate object within the corpus, and/or may be based on explicit mentions, within the corpus, of direct associations of the candidate object with other terms. In some embodiments, a determination of whether or not a concept of the corpus is to be included in the first set of concepts may be based on a respective weight of the concept, where the weight of a concept is indicative of a degree of matching between the concept and the candidate object, e.g., as determined by the first semantic analysis technique, for example.

Generally, the first semantic analysis technique may comprise any known semantic analysis technique. For example, the first semantic analysis technique may be an explicit semantic analysis technique (such as ESA, SSA, NASARI, a dictionary-based semantic analysis technique, a co-occurrence semantic analysis technique, or another explicit semantic modeling technique), or the first semantic analysis technique may be an implicit semantic analysis technique (such as LSA, LDA, or another implicit technique that utilizes a probabilistic model; CW vectors, word2Vec, GloVe, another implicit technique that utilizes a neural network model; or another implicit semantic modeling technique).

In an embodiment, applying the first semantic analysis technique includes searching the corpus based on the candidate object for the first set of concepts. The search may utilize a search index such as an inverted search index or other suitable index, and indeed, in some embodiments, the method 200 includes constructing the search index. Further, the search space of the corpus may be limited based on one or more search-limiting parameters, such as a minimum length of corpus records that are to be included in the search, a field of search of corpus records (e.g., the entire record, only the title, only the title and abstract, etc.), a maximum number of records that are initially retrieved for the search, a maximum number of words included in the title or name of each corpus record that is to be included in the search, etc.

At a block 208, the method 200 includes applying a second semantic analysis technique to the first set of concepts to discover a second set of concepts associated with the candidate object. Each concept included in the second set of concepts comprises a respective one or more natural language words, terms, or phrases, and each concept included in the second set of concepts is latently associated with the candidate object. The latent association may be derived from one or more concepts of the first set of concepts that are explicitly or implicitly associated with the candidate object, for example. The application of the second semantic analysis technique to discover the second set of concepts may include mining a set of concept association rules of the corpus based on the first set of concepts to determine a second set of concepts. For example, for each concept included in the first set of concepts, the set of concept association rules may be mined to determine a respective set of latently associated concepts corresponding to the each concept.

The set of concept association rules from which the second set of concepts are determined may be generated based on record-links included in the units or records of the corpus. As previously mentioned, a "record-link" included in a unit or record of a corpus comprises a reference or link to another record of the corpus. The reference or link may comprise natural language, alphanumeric text, a hyperlink, or any other suitable representation of an indication of another record of the corpus.

The set of concept association rules may have been generated from a set of transactions that has been constructed from the corpus, e.g., a "transaction dictionary," and indeed, in some embodiments of the method 200, the method 200 includes generating the set of concept association rules from the transaction dictionary. Generally speaking, a transaction dictionary of a corpus is constructed based on the contents of a plurality of corpus units or records of the corpus, and may include one or more transactions. Each transaction respectively corresponds to a particular concept whose respective corpus unit or record includes therein one or more record-links, and each transaction indicates the particular concept, as well as one or more other concepts that are respectively indicated by the one or more record-links included in the respective corpus unit or record of the particular concept, e.g., latent concepts of the first-degree. A transaction may indicate latent concepts of other degrees (e.g., second-degree, third-degree, etc.), if desired. In some embodiments, the method 200 may include generating or constructing the transaction dictionary of the corpus from the corpus units or records.

As such, in some embodiments, generating the set of conception association rules based on the transaction dictionary may include mining the set of transactions of the corpus for record-links included therein. Additionally or alternatively, generating the set of concept association rules based on the transaction dictionary may include generating the set of concept association rules that is to be mined for latent concepts based on the measures of support and confidence of the concept association rules as indicated by the transaction dictionary. A measure of support for a concept association rule may be determined, for example, based on a total number of occurrences in the transaction dictionary of a set of antecedent concepts of the rule in conjunction with a set of consequence concepts of the rule. A measure of confidence for concept association rule may be to be determined, for example, based on the rules measure of support and the total number of occurrences in the transaction dictionary of the set of antecedent concepts. The size of the generated set of concept association rules that is to be mined for latent concepts may be limited, if desired, based on one or more rules-limiting parameters such as a number of concepts included in the set of consequence concepts, a minimum strength of a measure of support, a minimum strength of a measure of confidence, etc.

At a block 210, the method 200 includes generating a concept space for the candidate object. The concept space may include both at least a portion the first set of concepts that were determined based on explicit mentions and explicit mentions of direct associations with the candidate object within the corpus (block 205), e.g., by either explicit derivation or implicit derivation, and at least a portion of the second set of concepts that were determined based on discovered concepts of the candidate object within the corpus (block 208) that were latently derived. Generally speaking, the concept space of the candidate object comprises a subset of the total set of concepts included in the corpus.

In some embodiments, the method 200 optionally includes displaying a representation of the concept space of the candidate object, e.g., on a user interface (block 212). The representation of the concept space may include indications of the concepts included in the concept space and, for each latently-associated concept, an indication of an explicitly-associated or implicitly-associated concept from which the latently-associated concept was derived. For example, the concept space may be graphically represented as a tree, such as shown in FIGS. 3A, 3C and 3D, with branches indicating the relationships between concepts. A user may explore the concept space by selecting and/or activating various user controls to, for example, expand the detail of how many concepts are displayed on certain branches of the tree, prune the display of certain branches of the tree, etc. Various user controls may cause related corpus units or records (and/or indications or contents thereof) to be displayed on the user interface. The method 200 may additionally or alternatively include displaying other discovered knowledge at the user interface, in some scenarios.

In some embodiments, the method 200 optionally includes determining a measure of relatedness between the first candidate object and a second candidate object (block 215). For example, a concept space of the second candidate object may be determined in a manner similar to that as previously discussed for the first candidate object, e.g., via the blocks 202-210. The respective weights of the concept spaces may be measured to determine the measure of relatedness between the first and second candidate objects. For example, a cosine similarity measure or other suitable technique may be applied to the weights of the first and second concept spaces to determine the measure of relatedness between the first and second candidate objects. In an embodiment, the concept spaces may be represented by vectors. For example, the concept space vectors may be sparsified to have the same length, respective weight vectors may be determined from the sparsified concept space vectors, and a measure of similarity between the weight vectors of the concept spaces may be determined to deterministically represent or quantify the degree of similarity between the candidate objects. The measure of similarity between the candidate objects may be normalized, if desired.

Figure 6:
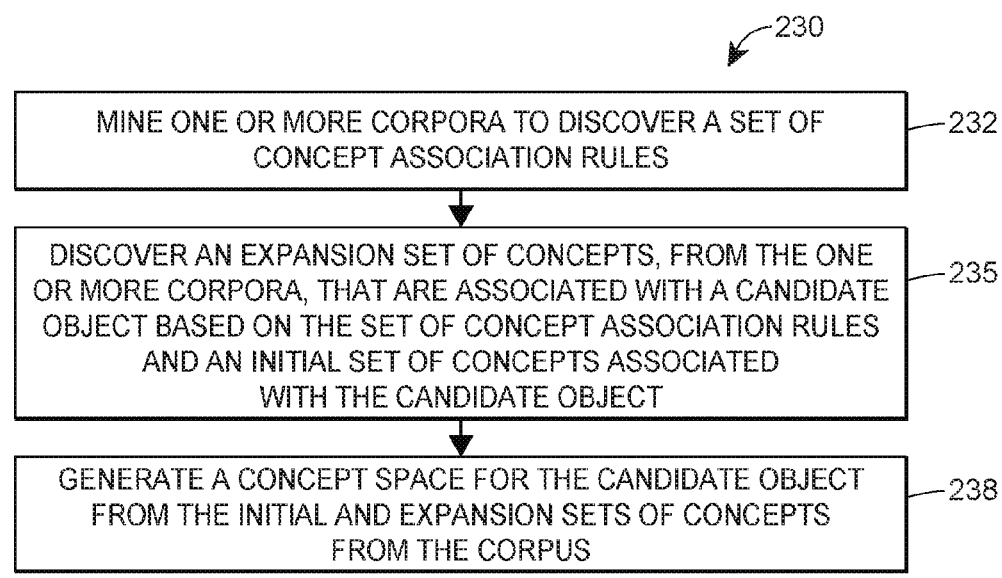
FIG. 6 depicts a flow chart of an example method for generating or discovering a concept space, within a corpus including natural language, of a candidate natural language term.

FIG. 6 depicts at a flow chart of an example method 230 of generating a concept space, within a corpus comprising natural language, of a natural language object. At least a portion of the method 230 may be performed, in some embodiments, in conjunction with one or more portions of the method 200 of FIG. 5. Additionally or alternatively, at least a portion of the method 230 may be performed by one or more parts of the NLR tool 100 of FIG. 1. For example, at least a portion of the method 230 may be performed by the initial semantic analyzer 108, the concept expander 118, and/or the concept space generator 130 of the tool 100. Of course, one or more portions of the method 230 may be performed in conjunction with other methods, and/or by other natural language processing tools or systems. However, for ease of discussion herein and not for limitation purposes, the method 230 is described with simultaneous reference to the NLR tool 100 of FIG. 1.

At a block 232, the method 230 includes mining a corpus for a set of concept association rules. The corpus that is mined may include a plurality of corpus units or records, each of which corresponds to a respective base concept. For example, the corpus may be the corpus C described with respect to FIG. 1, or the corpus may be the corpus 125 shown in FIG. 2. The set of concept association rules may be determined based on record-links included in the plurality of corpus units or records of the corpus, such as in a manner previously described above. For example, the set of the concept association rules may be determined by mining a transaction dictionary that has been constructed from the corpus based on record-links included in the units or records of the corpus and, in some situations, may have been determined based on measures of supports and measures of confidences of candidate concept association rules. In an embodiment, candidate concept association rules having a respective measure of support greater than a support threshold and/or having a respective measure of confidence greater than a confidence threshold may be included in the set of concept association rules that are to be mined. Further, the size of the set of concept association rules may be limited based on one or more rules-limiting parameters, such as in a manner previously described above.

At a block 235, the method 230 includes discovering an expansion subset of concepts of the corpus that are latently associated with a candidate object based on the set of concept association rules. The candidate object may comprise one or more natural language words or terms, and discovering the expansion subset of concepts may include mining the set of concept association rules based on an initial subset of concepts of the corpus that are explicitly or implicitly associated with the candidate object. For example, the initial subset of concepts may have been determined based on an explicit semantic analysis or an implicit semantic analysis performed on the corpus. Indeed, in some embodiments, the method 230 may include generating the initial subset of concepts of the corpus by performing the explicit or implicit semantic analysis. The explicit or implicit semantic analysis may include performing a search of the corpus based on the candidate object, and the search may be limited by one or more search-limiting parameters if desired, for example, such as in a manner previously described above. In some embodiments, a size of the mined set of concept association rules may be limited based on one or more rules-limiting parameters, such as in a manner previously described above.

At a block 238, the method 230 includes generating concept space of the candidate object from at least a portion of the initial subset of concepts and at least a portion of the expansion subset of concepts. Each concept included in the concept space comprises a respective one or more natural language words or terms, and generally, concept space of the candidate object is a subset of a total number of concepts included in the corpus. Accordingly, the generated concept space includes a set of concepts of the corpus that are more related to the candidate object (as deterministically determined) than are other concepts of the corpus that are excluded from the concept space.

Similar to as discussed previously with respect to the method 200, a representation of the concept space generated at the block 238 may be displayed on a user interface and may include one or more user controls to receive the various user commands and/or selections to adjust the one or more portions of the content of the concept space that is displayed on the user interface; to provide indications of and/or details of contents from related corpus records, and the like. Also similar to as discussed previously with respect method 200, a deterministic measure of relatedness between two candidate objects may be calculated or generated, and a representation of the relatedness measure may be presented at the user interface.

Figure 7:
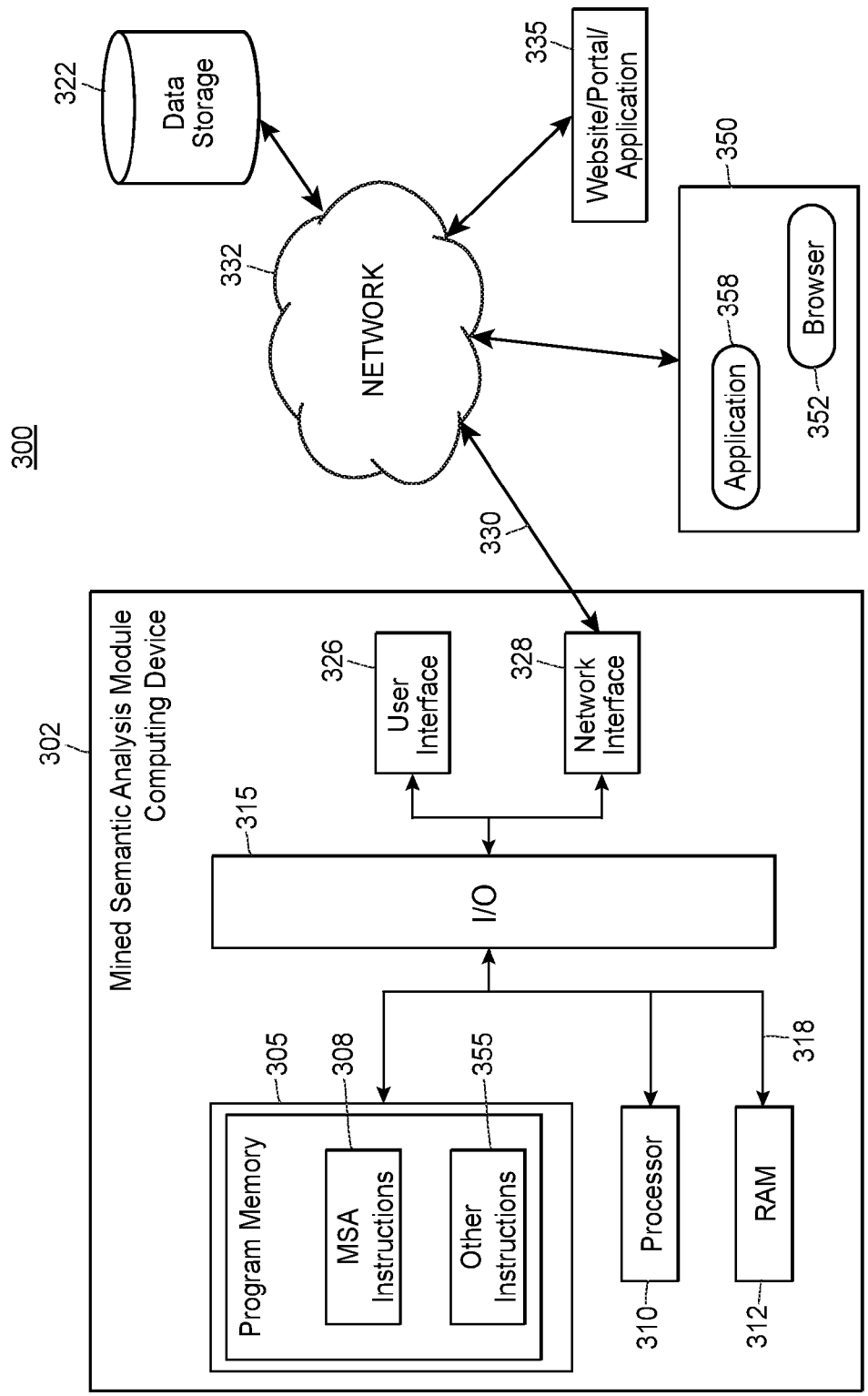
FIG. 7 includes a block diagram illustrating an exemplary Mined Semantic Analysis system.

Turning now to FIG. 7, FIG. 7 includes a block diagram illustrating an exemplary Mined Semantic Analysis system 300. In some embodiments, the system 300 may include at least a portion of a Natural Language Relatedness tool, such as the tool 100 of FIG. 1. Additionally or alternatively, the system 300 may perform at least a portion of the method 200 of FIG. 5 and/or at least a portion of the method 230 of FIG. 6, in some embodiments.

As shown in FIG. 7, the system 300 may include a Mined Semantic Analysis module 302 comprising one or more computing devices 302. The MSA module 302 comprising the one or more computing devices may include, for example, a computer, a server, a plurality of networked or banked computing devices having a logical appearance of a single computing device, a plurality of cloud computing devices, etc. Accordingly, for ease of discussion only and not for limitation purposes, the computing device comprising the MSA module 302 is referred to herein using the singular tense, although in some embodiments the computing device 302 may include more than one physical computing device.

The computing device 302 may include a program memory 305, a processor 310 (e.g., a controller, a microcontroller, a microprocessor, etc.), a random-access memory (RAM) 312, and an input/output (I/O) circuit 315, all of which may be interconnected via an address/data bus 318. The program memory 305 may comprise one or more tangible, non-transitory computer-readable storage media and/or devices, and may store thereon a particular set of computer-readable and/or computer-executable instructions 308 that, when executed by the processor 310, may cause the computing device 302 to perform one or more mined semantic analysis techniques, such as one or more of the MSA techniques described herein. For example, the instructions 308 may include respective sets of instructions for one or more of the pre-processor 112, the initial semantic analyzer 108, the concept expander 118, the concept space generator 130, or the relatedness scorer 135 of FIG. 1. Generally, though, the instructions 308 are referred to herein as "MSA instructions 308." Accordingly, the MSA instructions 308, when executed by the processor 310, may cause the computing device 302 to perform the one or more of the MSA techniques described herein.

The computing device 302 may be configured and/or adapted to access one or more data or memory storage devices 322. For example, the MSA instructions 308 may access the one or more data storage devices 322 to perform one or more of the MSA techniques described here.

The one or more data storage devices 322 may comprise, for example, one or more memory devices, a data bank, cloud data storage, and/or one or more other suitable data storage devices. Indeed, the one or more data storage devices 322 may include one physical device, or the one or more data or memory storage devices 322 may include more than one physical device. The one or more data storage devices 322, though, may logically appear as a single data storage device irrespective of the number of physical devices included therein. Accordingly, for ease of discussion only and not for limitation purposes, the data storage device 322 is referred to herein using the singular tense.

The data or memory storage device 322 may be configured and/or adapted to store data related to the system 300. For example, the data storage device 322 may be configured and/or adapted to store information such as the search index 115, the concept association rules 122, and/or one or more corpora, e.g., the corpora C, the corpora 125, 145, and/or other corpora.

In one embodiment (not shown), at least one of the one or more data storage devices 322 may be included in the computing device 302, and the processor 310 of the computing device 302 (or the MSA instructions 308 executed by the processor 310) may access the one or more data storage devices 322 via a link comprising a read or write command, function, application programming interface, plug-in, operation, instruction, and/or similar.

In the present embodiment illustrated in FIG. 7, though, the computing device 302 is shown as being configured to access the one or more data storage devices 322 via one or more network or communication interfaces 328 that are respectively coupled to a link 330 in communicative connection with the one or more data storage devices 322. The link 330 in FIG. 7 is depicted as a link to one or more private and/or public networks 332 (e.g., the one or more data storage devices 322 may be remotely located from the computing device 302), however, the network 332 is not required for the computing device 302 and the data storage device 322 to be communicatively connected. For example, the link 330 may provide a direct connection between the computing device 302 and the data storage device 322. The link 330 may include one or more wired links and/or one or more wireless links, and/or may utilize any suitable communications technology. The network 332 may include one or more proprietary networks, the public Internet, one or more virtual private networks, and/or some other type of network, such as dedicated access lines, plain ordinary telephone lines, satellite links, data networks, combinations of these, etc.

Additionally or alternatively, the system 300 may include and the network 332 may communicatively connect one or more computing devices that host one or more websites, portals, server applications, remote applications, customer-facing processes, etc. (reference 335). For example, the website/portal computing device 335 may host a website, portal, or other remote application.

As depicted in FIG. 7, a computing device 350 being operated by a user may be communicatively connected to the MSA module 302. For example, the user's computing device 350 may be communicatively connected with the MSA module 302 via a browser 352 executing on the user's computing device 350 and a website and/or portal. In some embodiments, a user's computing device 350 may communicatively connect to the MSA module 302 by using an application 358 (e.g., a local software and/or client application) stored and/or executing thereon. For example, a user may download a client application 358, e.g., from the computing device 302, the host device of the external website and/or application 335, and/or the data storage device 322. Subsequently, the client application 358 and the MSA instructions 308 may establish a secure connection (e.g., a secured session) for communications therebetween over the network 332.

It is noted that while in FIG. 7, the MSA module computing device 302, the data storage device 322, and the other computing devices 335, 350 included in the system 300 are illustrated as separate and distinct entities, this is only one of many embodiments. Any number of any of the devices 302, 322, 335, 350 may be included in the network 332, for example. Additionally or alternatively, any number of any of the devices 302, 322, 335, 350 may be a logical, combined or integral device or set of devices. For example, the MSA module computing device 302 may host the website(s) and/or portal(s) 335.

With particular regard to the MSA module 302, in addition to the MSA instructions 308, the program memory 305 may store thereon further computer-readable or computer-executable instructions 355 that further particularly configure the computing device 302 and that may be executed in conjunction with MSA applications. For example, the other instructions 355 may execute to allow a user to manipulate the presentation of discovered knowledge, and save, sort, or send portions of the discovered knowledge, for example. The other instructions 355 may allow the user to perform predictive analytics on discovered knowledge, in another example. Other functions corresponding to MSA may be performed by the instructions 355. In some embodiments, at least a portion of the other instructions 355 may be integral with at least a portion of the MSA instructions 308.

Further, with regard to the computing device 302, while the MSA instructions 308 are shown as a single block in FIG. 7, it will be appreciated that the MSA instructions 308 may include any number of different programs, modules, routines, and/or sub-routines that may collectively cause the computing device 302 to implement their respective functionality. Similarly, while the other instructions 355 is shown as a single block, it will be appreciated that the other instructions 355 may include a number of different programs, modules, routines, and/or sub-routines that may collectively cause the computing device 302 to implement the other instructions 355.

Still further, it should be appreciated that although only one processor 310 is shown, the computing device 302 may include multiple processors 310. Additionally, although the I/O circuit 315 is shown as a single block, it should be appreciated that the I/O circuit 315 may include a number of different types of I/O circuits. Similarly, the memory of the computing device 302 may include multiple RAMs 312 and/or multiple program memories 305. Further, while the MSA instructions 308, and/or the other instructions 355 are shown being stored in the program memory 305, any or all of the instructions 308, 355 may additionally or alternatively be partially or entirely stored in the RAM 312 and/or other suitable local memory (not shown).

The RAM(s) 312 and/or program memories 305 may be implemented as semiconductor memories, magnetically readable memories, chemically or biologically readable memories, and/or optically readable memories, and/or may utilize any suitable memory technology or technologies. The computing device 302 may also be operatively connected to the network 332 via the link 330 and the I/O circuit 315, in some embodiments.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects indicated below:

A1. A natural language-relatedness (NLR) tool, comprising:
an input interface via which an initial subset of a set of concepts of a corpus is received, each concept of the initial subset of concepts being semantically associated with a candidate term, the candidate term comprising one or more natural language words, the corpus comprising natural language text, and the semantic associations of the initial subset of concepts with the candidate term determined based on a first semantic analysis of the corpus;
a concept expander comprising first computer-executable instructions that are stored on one or more memories and that, when executed by one or more processors, cause the NLR tool to mine, based on the initial subset of concepts, a set of concept association rules of the corpus to discover an expansion subset of concepts of the corpus, each concept of the expansion subset of concepts being semantically associated with the candidate term; and
a concept space generator comprising second computer-executable instructions that are stored on the one or more memories and that, when executed by the one or more processors, cause the NLR tool to generate a concept space of the candidate term, the concept space including at least a portion of the initial subset of concepts and at least a portion of the expansion subset of concepts.

A2. The NLR tool of the previous aspect, wherein at least one of:
the each concept of the initial subset of concepts has a respective weight greater than a first threshold, the respective weight of the each concept of the initial subset of concepts being indicative of a respective degree of matching between the each concept of the initial subset of concepts and the candidate term; or
the each concept of the expansion subset of concepts has a respective weight greater than the first threshold or a second threshold, the respective weight of the each concept of the expansion subset of concepts being indicative of a respective degree of matching between the each concept of the expansion subset of concepts and the candidate term.

A3. The NLR tool of any one of the previous aspects, wherein the NLR tool further comprises an initial semantics analyzer that performs the first semantic analysis of the corpus, and the first semantic analysis comprises a search of the corpus based on the candidate term.

A4. The NLR tool of any one of the previous aspects, wherein the initial semantics analyzer performs an explicit semantic analysis technique that utilizes a search index generated from the corpus.

A5. The NLR tool of any one of the previous aspects, wherein: the explicit semantic analysis technique comprises at least one of Explicit Semantic Analysis (ESA), Salient Semantic Analysis (SSA), a Novel Approach to a Semantically-Aware Representation of Items (NASARI), a dictionary-based semantic analysis technique, a co-occurrence semantic analysis technique, or another explicit semantic modeling technique; and the search index comprises an inverted search index.

A6. The NLR tool of any one of the previous aspects, wherein: the corpus comprises a plurality of corpus records; the search of the corpus is limited based on a set of search-limiting parameters; and the set of search-limiting parameters includes at least one of: a minimum length of each corpus record included in the search, a field of search of the each corpus record included in the search, a maximum number of corpus records to retrieve for the search, or a maximum number of words of a title or name of the each corpus record included in the search.

A7. The NLR tool of any one of the previous aspects, wherein:
the candidate term is a first candidate term, the expansion subset of concepts is a first expansion subset of concepts, and the concept space is a first concept space;
the concept expander discovers a second expansion subset of concepts that are semantically associated with a second candidate term and the concept space generator generates a second concept space of the second candidate term; and
the NLR tool further comprises a relatedness score generator that generates a score indicative of a measure of relatedness between the first candidate term and the second candidate term based on respective weight vectors of the respective concept spaces of the first and second candidate terms.

A8. The NLR tool of any one of the previous aspects, wherein the score indicative of the measure of relatedness between the first candidate term and the second candidate term is based on a cosine similarity measure applied to the respective weight vectors of the first and second candidate terms.

A9. The NLR tool of any one of the previous aspects, wherein the concept spaces of the first and second candidate terms are sparsified to respectively have a same length, and the score indicative of the measure of relatedness between the first candidate term and the second candidate term is a normalized score.

A10. The NLR tool of any one of the previous aspects, wherein the concept space of the candidate term includes a union of the at least the portion of the initial subset of concepts and the at least the portion of the expansion subset of concepts.

A11. The NLR tool of any one of the previous aspects, wherein: the corpus comprises a plurality of corpus records; the set of concept association rules are mined from a set of transactions of the corpus; and each transaction included in the set of corpus transactions (i) corresponds to a respective base concept of a respective particular corpus record, and (ii) indicates one or more base concepts of one or more other corpus records, the one or more other corpus records respectively indicated by one or more record-links included in the respective particular corpus record.

A12. The NLR tool of any one of the previous aspects, wherein the each transaction included in the set of corpus transactions further indicates the respective base concept.

A13. The NLR tool of any one of the previous aspects, wherein a respective inclusion of each concept association rule in the set of concept association rules is based on (i) a respective measure of support determined based on a total number of occurrences, in the set of corpus transactions, of a set of antecedent concepts of the each conception association rule in conjunction with a set of consequence concepts of the each conception association rule, and (ii) a respective measure of confidence determined based on the respective measure of support and a total number of occurrences, in the set of corpus transactions, of the set of antecedent concepts.

A14. The NLR tool of any one of the previous aspects, wherein a size of the set of concept association rules is limited based on a set of rule-limiting parameters, the set of rule-limiting parameters including at least one of: a number of concepts included in the set of consequence concepts, a minimum strength of the respective measure of support, or a minimum strength of the respective measure of confidence.

A15. The NLR tool of any one of the previous aspects, wherein the each concept of the initial subset of concepts has a respective explicitly-derived or implicitly-derived association with the candidate term, and wherein the each concept of the second set of concepts has a respective latent association with the candidate term that is derived from a respective concept included in the initial subset of concepts.

A16. The NLR tool of any one of the previous aspects, wherein the corpus comprises a plurality of corpus records, and each corpus record of the plurality of corpus records corresponds to a respective base concept.

A17. The NLR tool of any one of the previous aspects, wherein a particular corpus record included in the plurality of corpus records includes one or more record-links to one or more other respective corpus records, the one or more other respective corpus records respectively having one or more other base concepts, and the one or more other base concepts being latent concepts of the base concept of the particular corpus record.

A18. The NLR tool of any one of the previous aspects, wherein: the one or more latent concepts of the base concept of the particular record are one or more first-degree latent concepts of the base concept of the particular corpus record; and one or more second-degree latent concepts of the base concept of the particular record include the respective base concepts of one or more corpus records indicated by one or more record-links included in the one or more other respective corpus records corresponding to the one or more first-degree latent concepts.

A19. The NLR tool of any one of the previous aspects, wherein:
the corpus comprises an encyclopedia, the plurality of corpus records comprises a plurality of articles of the encyclopedia, and the particular corpus record is a particular encyclopedia article;
the base concept of the particular encyclopedia article comprises an article name of the particular encyclopedia article, and
the one or more record-links included in the particular encyclopedia article comprise one or more references to other encyclopedia articles referenced in particular encyclopedia article.

A20. The NLR tool of any one of the previous aspects, wherein the encyclopedia is a digital encyclopedia.

A21. The NLR tool of any one of the previous aspects, wherein the encyclopedia is an on-line encyclopedia.

A22. The NLR tool of any one of the previous aspects, wherein the encyclopedia is an encyclopedia for a particular topic, the particular topic related to one of: health, medicine, investing, finances, economics, or intellectual property.

A23. The NLR tool of any one of the previous aspects, wherein: the set of encyclopedia articles comprises a set of Wikipedia articles and the particular encyclopedia article is a particular Wikipedia article; and at least a portion of the one or more record-links of the particular Wikipedia article at least one of (i) are included in a "See also" section of the respective Wikipedia article, or (ii) comprise a hyperlink.

A24. The NLR tool of any one of the previous aspects, wherein the corpus comprises a set of health-related articles and/or records.

A25. The NLR tool of any one of the previous aspects, wherein the corpus comprises at least one of intellectual property patents, publications, or court case decisions.

A26. The NLR tool of any one of the previous aspects, wherein the corpus comprises financial information articles.

A27. The NLR tool of any one of the previous aspects, wherein the corpus comprises a first plurality of corpus records having a first format or syntax and a second plurality of corpus records having a second format or syntax different than the first format or syntax.

A28. The NLR tool of any one of the previous aspects, wherein the first plurality of corpus records and the second plurality of corpus records are mutually exclusive.

B1. A method of generating a concept space of a natural language term within a corpus, the method comprising:
receiving a candidate term, the candidate term comprising one or more natural language words;
applying a first semantic analysis technique to a corpus based on the candidate term, the corpus comprising natural language, thereby discovering a first set of concepts associated with the candidate term, and each concept included in the first set of concepts comprising a respective one or more natural language terms, each of which is at least one of explicitly or implicitly associated with the candidate term;
applying a second semantic analysis technique to the first set of concepts, thereby discovering a second set of concepts associated with the candidate term, the application of the second semantic analysis technique including mining a set of concept association rules based on the first set of concepts,
the set of concept association rules generated based on record-links included in records of the corpus, and
each concept included in the second set of concepts comprising a respective one or more natural language terms, each of which is latently associated with the candidate term; and
generating a concept space for the candidate term from the first set of concepts and the second set of concepts, the concept space for the candidate term being a subset of a total set of concepts included in the corpus.

B2. The method of the previous aspect, wherein discovering the first set of concepts associated with the candidate term comprises determining the first set of concepts based on at least one of (i) explicit mentions of the candidate term within the corpus, or (ii) explicit mentions of respective associations of other terms with the candidate term within the corpus.

B3. The method of any one of the aspects B1-B2, further comprising displaying a representation of the concept space of the candidate term, the representation including, for each one or more latently-associated concepts of the candidate term, a respective indication of its association with a respective explicitly-associated or implicitly-associated concept from which the respective latent association was derived; and optionally displaying representation of knowledge other than the concept space that is discovered as being associated with the candidate term.

B4. The method of any one of the aspects B1-B3, further comprising receiving a user selection of a particular concept indicated in the displayed representation of the concept space of the candidate term, and displaying one or more records of the corpus corresponding to the particular concept.

B5. The method of any one of the aspects B1-B4, further comprising modifying, based on a user input, a total number of indications of concepts corresponding to the candidate term and included in the displayed representation of the concept space.

B6. The method of any one of the aspects B1-B5, wherein at least one of: discovering the first set of concepts associated with the candidate term comprises generating the first set of concepts based on a respective degree of matching between the each concept included in the first set of concepts and the candidate term; or discovering the second set of concepts associated with the candidate term comprises generating the second set of concepts based on a respective degree of matching between the each concept included in the second set of concepts and the candidate term.

B7. The method of any one of the aspects B1-B6, wherein applying the first semantic analysis technique comprises using a search index to search the corpus, and wherein the method further comprises constructing the search index.

B8. The method of any one of the aspects B1-B7, further comprising limiting a search space of the first semantic analysis technique.

B9. The method of any one of the aspects B1-B8, wherein applying the first semantic analysis technique to the corpus comprises applying an explicit semantic analysis technique to the corpus.

B10. The method of any one of the aspects B1-B9, wherein applying the first semantic analysis technique to the corpus comprises applying an implicit semantic analysis technique to the corpus.

B11. The method of any one of the aspects B1-B10, further comprising generating the set of concept association rules, including mining a set of transactions of the corpus, each transaction of the set of transactions indicating (i) a respective base concept of a respective particular record of the corpus, and (ii) and a respective set of other concepts of one or more other records of the corpus, the one or more other records respectively indicated by one or more record-links included in the respective particular record of the corpus.

B12. The method of any one of the aspects B1-B11, wherein: the respective set of other concepts indicated by the each transaction is a first respective set of other concepts, and the one or more other records of the corpus is a first set of other records; and the each transaction further indicates a second respective set of other concepts, the second respective set of other concepts indicated by one or more record-links included in the first set of other records.

B13. The method of any one of the aspects B1-B12, further comprising generating the set of transactions, including mining a plurality of records of the corpus for record-links included therein.

B14. The method of any one of the aspects B1-B13, wherein generating the set of concept association rules comprises generating the set of concept association rules based on (i) a respective measure of support determined based on a total number of occurrences, in the set of transactions, of a set of antecedent concepts of each conception association rule in conjunction with a set of consequence concepts of the each conception association rule, and (ii) a respective measure of confidence determined based on the respective measure of support and a total number of occurrences, in the set of corpus transactions, of the set of antecedent concepts.

B15. The method of any one of the aspects B1-B14, wherein generating the set of concept association rules comprises limiting a size of the set of concept association rules.

B16. The method of any one of the aspects B1-B15, wherein the candidate term is a first candidate term and the concept space is a first concept space, and wherein the method further comprises:

receiving a second candidate term, the second candidate term comprising a respective one or more natural language words;

generating a second concept space for the second candidate term using the first semantic analysis technique and the second semantic analysis technique; and determining a measure of relatedness between the first candidate term and the second candidate term based on respective weights of the first concept space of the first candidate term and the second concept space of the second candidate term.

B17. The method of any one of the aspects B1-B16, wherein:

applying the first semantic analysis technique to the corpus comprises applying the first semantic analysis technique to a plurality of corpora;

the concept space for the candidate term comprises a subset of a total set of concepts included in the plurality of corpora; and a format of records included in a first corpus of the plurality of corpora differs from a format of records included in a second corpus of the plurality of corpora.

B18. The method of any one of the aspects B1-B17, wherein the corpus comprises a plurality of corpus records including intellectual property patents and patent publications.

B19. The method of any one of the aspects B1-B18, wherein the corpus comprises a plurality of corpus records including at least one of financial information articles or financial records.

B20. The method of any one of the aspects B1-B19, wherein the corpus comprises a plurality of corpus records including at least one of health-care related articles or health-care records.

B21. The method of any one of the aspects B1-B20, wherein the corpus comprises a plurality of corpus records including at least one of encyclopedia or journal articles.

B22. The method of any one of the aspects B1-B21, wherein at least a portion of the method is performed by at least a portion of one of the tools A1-A28.

C1. A method of determining a concept space of a natural language term within a corpus, the method comprising:

mining a corpus for a set of concept association rules of the corpus, the corpus comprising natural language, and the set of concept association rules determined based on record-links included in a plurality of records of the corpus;

discovering, based on the set of concept association rules and an initial subset of concepts of the corpus that are at least one of explicitly or implicitly associated with a candidate term, an expansion subset of concepts of the corpus that are latently associated with the candidate term, the candidate term comprising one or more natural language terms; and generating a concept space of the candidate term from at least a portion of the initial subset of concepts and at least a portion of the expansion subset of concepts, wherein each concept included in the concept space comprises a respective one or more natural language terms.

C2. The method of the previous aspect, wherein:

mining the corpus for the set of concept association rules comprises mining a set of transactions constructed from the corpus for the set of concept association rules;

the method further comprises constructing the set of corpus transactions from a plurality of units of the corpus;

each concept transaction included in the set of corpus transactions indicates a respective base concept of a respective corpus unit and one or more first-degree latent concepts of the respective base concept, the one or more first-degree latent concepts of the respective base concept being one or more other base concepts of one or more other corpus units; and the one or more other corpus units are indicated by one or more record-links included in the respective corpus unit.

C3. The method of any one of the aspects C1-C2, wherein:

the each concept transaction included in the set of corpus transactions further indicates one or more second-degree latent concepts of the respective base concept;

the one or more second-degree latent concepts of the respective base concept include one or more base concepts of one or more still other corpus units, and the one or more still other corpus units are indicated by one or more record-links included in the one or more other corpus units.

C4. The method of any one of the aspects C1-C3, wherein mining the set of corpus transactions for the set of concept association rules comprises, for each candidate rule included in the set of concept association rules:

determining a respective measure of support based on a number of occurrences, in the set of corpus transactions, of a set of antecedent concepts of the each candidate rule together with a set of consequence concepts of concepts of the each candidate rule;

determining a respective measure of confidence based on the respective measure of support and a number of occurrences, in the set of corpus transactions, of the set of antecedent concepts of the each candidate rule; and determining a set of candidate rules as the set of concept association rules based on a support threshold and a confidence threshold.

C5. The method of any one of the aspects C1-C4, further comprising limiting a size of the set of concept association rules based on a set of rule-limiting parameters, the set of rule-limiting parameters including at least one of: a number of concepts included in the set of consequence concepts, a minimum strength of the respective measure of support, or a minimum strength of the respective measure of confidence.

C6. The method of any one of the aspects C1-C5, wherein determining the set of candidate rules as the set of concept association rules is further based on a concept weight threshold, and wherein a respective weight of a respective concept is indicative of a degree of matching between the respective concept and the candidate term.

C7. The method of any one of the aspects C1-C6, further comprising generating the initial subset of concepts of the corpus, including performing, based on the candidate term, a search of the corpus using an explicit semantic analysis technique or an implicit semantic analysis technique.

C8. The method of any one of the aspects C1-C7, further comprising limiting the search of the corpus based on a set of search-limiting parameters, the set of search-limiting parameters including at least one of: a minimum length of each corpus record included in the search, a field of search of the each corpus record included in the search, a maximum number of corpus records to retrieve for the search, or a maximum number of words of a title or name of the each corpus record included in the search.

C9. The method of any one of the aspects C1-C8, wherein performing the search of the corpus using the explicit semantic analysis technique comprises performing the search of the corpus using an inverted search index and one of Explicit Semantic Analysis (ESA), Salient Semantic Analysis (SSA), a Novel Approach to a Semantically-Aware Representation of Items (NASARI), a dictionary-based semantic analysis technique, a co-occurrence semantic analysis technique, or another explicit semantic modeling technique.

C10. The method of any one of the aspects C1-C9, wherein performing the search of the corpus using the implicit semantic analysis technique comprises performing the search of the corpus using an inverted search index and one of Latent Semantic Analysis (LSA), Latent Dirichlet Allocation (LDA), another implicit technique that utilizes a probabilistic model, CW vectors, Word2Vec, GloVe, another implicit technique that utilizes neural network model, or another implicit semantic modeling technique.

C11. The method of any one of the aspects C1-C10, wherein the candidate term is a first candidate term, and the method further comprises:

discovering, by mining the set of concept association rules based on an initial subset of concepts of the corpus that are at least one of explicitly or implicitly associated with a second candidate term, an expansion subset of concepts of the corpus that are latently associated with the second candidate term, the second candidate term comprising one or more natural language terms;

generating a concept space of the second candidate term from at least a portion of the initial subset of concepts associated with the second candidate term and at least a portion of the second subset of concepts associated with the second candidate term; and determining a measure of relatedness between the first candidate term and the second candidate term based on respective weight vectors of the concept space of the first candidate term and the concept space of the second candidate term.

C12. The method of any one of the aspects C1-C11, further comprising sparsifying the concept space of the first candidate term and the concept space of the second candidate term, and wherein the measure of relatedness is determined based on the respective weight vectors of the sparsified concept spaces.

C13. The method of any one of the aspects C1-C12, further comprising normalizing the measure of relatedness.

C14. The method of any one of the aspects C1-C13, wherein:

mining the corpus for the set of concept association rules comprises mining a plurality of corpora for the set of concept association rules, the plurality of corpora comprising natural language;

the concept space of the candidate term comprises a subset of a total set of concepts included in the plurality of corpora; and a format of records of a first corpus included in the plurality of corpora differs from a format of records of a second corpus included in the plurality of corpora.

C15. The method of any one of the aspects C1-C14, wherein mining the corpus comprises mining a plurality of mutually exclusive corpora.

C16. The method of any one of the aspects C1-C15, wherein the plurality of corpus records includes intellectual property patents and patent publications.

C17. The method of any one of the aspects C1-C16, wherein the plurality of corpus records includes financial information articles.

C18. The method of any one of the aspects C1-C17, wherein the plurality of corpus records includes at least one or health-care related articles or health-care records.

C19. The method of any one of the aspects C1-C18, wherein the plurality of corpus records includes at least one of encyclopedia or journal articles.

C20. The method of any one of the aspects C1-C19, wherein discovering the expansion subset of concepts that are latently associated with the candidate term based on the set of concept association rules and the initial subset of concepts comprises, for each concept included in the initial subset of concepts, mining the set of concept association rules to determine a set of concepts that are latently associated with the each concept included in the initial subset of concepts.

C21. The method of any one of the aspects C1-C20, wherein at least a portion of the method is performed by at least a portion of one of the tools A1-A28.

C22. The method of any one of the aspects C1-C21, wherein at least a portion of the method is performed in conjunction with at least a portion of any one of the methods B1-B22.

Accordingly, in view of the above, the tools, systems, and methods described herein are directed to an improvement to computer functionality. For example, not only do the tools, systems and methods described herein improve the functioning of conventional computers for use in the technological fields and environments utilized in natural language processing, computational linguistics, semantic analysis, and semantic relatedness, but the tools, systems, and methods described herein also improve the natural language processing, computational linguistics, semantic analysis, and semantic relatedness technological fields themselves. For example, the tools, systems, and methods described herein are able to search a corpus that includes natural language to discover latent concepts therein that are associated with an arbitrary natural language text input, and are able to deterministically measure the respective relatedness of the discovered latent concepts to explicitly discovered concepts, implicitly discovered concepts, and/or other latent concepts. Furthermore, the discovered concepts, as well as their interrelationships and derivations, may be represented or displayed as a concept graph, and the concept graph may be manipulated or otherwise modified by a user to automatically expand, reduce, or otherwise refine the search, or to start a related search.

Additionally, certain embodiments are described herein as including logic or a number of functions, components, modules, blocks, or mechanisms. Functions may constitute either software modules (e.g., non-transitory code or instructions stored on a tangible, non-transitory machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor that is specially configured using software, the general-purpose processor may be specially configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "method" or a "function" or an "algorithm" or a "routine" is a self-consistent sequence of operations or similar processing leading to a desired result. In this context, methods, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method of providing a flexible vehicle loan application process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A natural language-relatedness (NLR) search tool, comprising:
one or more memory storage devices storing respective computer-executable instructions for a semantic analyzer, a concept expander, and a concept space generator; and
one or more processors configured to:
obtain a candidate term via a user interface of the NLR search tool, the candidate term comprising one or more natural language words;
execute the respective computer-executable instructions stored on the one or more memory storage devices for the semantic analyzer, thereby causing the NLR search tool to operate, using at least one of an explicit semantic analysis or an implicit semantic analysis, on the candidate term to discover an initial subset of a set of concepts of a digital corpus, each concept of the initial subset of concepts being semantically associated with the candidate term, the digital corpus comprising a plurality of digital articles that are related in at least one of topic, subject matter, structure, syntax, or format, and each digital article including natural language therein, and the initial subset of concepts that corresponds to the candidate term and to the digital corpus being an output of the semantic analyzer;
execute the respective computer-executable instructions stored on the one or more memory storage devices for the concept expander, thereby causing the NLR search tool to:
mine a set of concept association rules from the digital corpus, including:
for each candidate rule corresponding to the set of concept association rules, (i) determine a respective measure of support based on a number of occurrences, in a set of transactions of the digital corpus, of a set of antecedent concepts of the each candidate rule together with a set of consequence concepts of the each candidate rule; and (ii) determine a respective measure of confidence based on the respective measure of support and a number of occurrences, in the set of corpus transactions, of the set of antecedent concepts of the each candidate rule; and determine a set of candidate rules as the set of concept association rules, a size of the set of concept association rules limited based on a set of rule-limiting parameters, and the set of rule-limiting parameters including at least one of: a number of concepts included in the set of consequence concepts, a minimum strength of the respective measure of support, or a minimum strength of the respective measure of confidence;

receive, as an input, the output of the semantic analyzer including the initial subset of concepts corresponding to the candidate term and to the digital corpus; and operate, using the set of concept association rules, on the initial subset of concepts that corresponds to the candidate term and to the digital corpus to discover an expansion subset of concepts of the digital corpus, each concept of the expansion subset of concepts being semantically associated with the candidate term;

execute the respective computer-executable instructions stored on the one or more memory storage devices for the concept space generator, thereby causing the NLR search tool to generate a concept space of the candidate term, the concept space including at least a portion of the initial subset of concepts corresponding to the candidate term and the digital corpus and at least a portion of the expansion subset of concepts corresponding to the candidate term and the digital corpus;

search, using the generated concept space, the digital corpus for a first set of digital articles corresponding to the at least the portion of the initial subset of concepts of the generated concept space and a second set of digital articles corresponding to the at least the portion of the expansion subset of concepts of the generated concept space;

retrieve, from the digital corpus, at least a portion of each digital article included in the second set of digital articles corresponding to the at least the portion of the expansion subset of concepts of the generated concept space; and display, at the user interface of the NLR search tool, the retrieved at least the portion of the each digital article included in the second set of digital articles corresponding to the at least the portion of the expansion subset of concepts of the generated concept space.

2. The NLR search tool of claim 1, wherein the concept space of the candidate term includes a union of the initial subset of concepts and the at least the portion of the expansion subset of concepts.

3. The NLR search tool of claim 1, wherein:
the plurality of digital articles included in the digital corpus comprises a plurality of corpus records; and
each transaction included in the set of corpus transactions (i) indicates a respective base concept of a respective particular corpus record, and (ii) indicates one or more base concepts of one or more other corpus records, the one or more other corpus records respectively indicated by one or more record-links included in the respective particular corpus record.

4. The NLR search tool of claim 1, wherein the each concept of the initial subset of concepts has a respective explicitly-derived or implicitly-derived association with the candidate term, and wherein the each concept of the second set of concepts has a respective latent association with the candidate term that is derived from a respective concept included in the initial subset of concepts.

5. The NLR search tool of claim 1, wherein the digital corpus comprises at least one of: an encyclopedia, a dictionary, a set of health-related articles and/or records, an intellectual property dataset, or a set of financial information articles and/or records.

6. The NLR search tool of claim 1, wherein the plurality of digital articles included in the digital corpus comprises at least one of:
a first plurality of corpus records having a first format or syntax and a second plurality of corpus records having a second format or syntax different than the first format or syntax; or
a plurality of corpora whose respective records are mutually exclusive.

7. A computer-implemented method for processing text, the computer-implemented method comprising:
using one or more processors configured to execute a natural language processing application, including:
the one or more processors receiving a candidate term via a user interface, the candidate term comprising one or more natural language words;
the one or more processors applying a first semantic analysis technique to a digital corpus based on the candidate term, the digital corpus comprising natural language, thereby discovering a first set of concepts associated with the candidate term, and each concept included in the first set of concepts comprising a respective one or more natural language terms, each of which is at least one of explicitly or implicitly associated with the candidate term;
the one or more processors applying a second semantic analysis technique to the first set of concepts discovered by the first semantic analysis technique, thereby discovering a second set of concepts associated with the candidate term, the application of the second semantic analysis technique including:
mining a set of concept association rules from the digital corpus, the set of concept association rules generated based on record-links included in a plurality of records of the digital corpus, and the mining of the set of concept association rules including:
for each candidate rule corresponding to the set of concept association rules, (i) determining a respective measure of support based on a number of occurrences, in a set of transactions of the digital corpus, of a set of antecedent concepts of the each candidate rule together with a set of consequence concepts of the each candidate rule; and (ii) determining a respective measure of confidence based on the respective measure of support and a number of occurrences, in the set of corpus transactions, of the set of antecedent concepts of the each candidate rule; and
determining a set of candidate rules as the set of concept association rules, the size of the set of concept association rules limited based on a set of rule-limiting parameters, and the set of rule-limiting parameters including at least one of: a number of concepts included in the set of consequence concepts, a minimum strength of the respective measure of support, or a minimum strength of the respective measure of confidence; and mining the set of concept association rules for the second set of concepts, each concept included in the second set of concepts comprising a respective one or more natural language terms, each of which is latently associated with the candidate term;

the one or more processors generating a concept space for the candidate term from the first set of concepts and the second set of concepts, the concept space for the candidate term being a subset of a total set of concepts included in the digital corpus;

the one or more processors searching, using the generated concept space, the digital corpus for a first set of records corresponding to at least a portion of the first set of concepts of the generated concept space and a second set of records corresponding to at least a portion of the second set of concepts of the generated concept space;

the one or more processors retrieving, from the digital corpus, at least a portion of each record included in the second set of records corresponding to the at least the portion of the expansion subset of concepts of the generated concept space; and the one or more processors displaying, at the user interface, the retrieved at least the portion of the each record included in the second set of records corresponding to the at least the portion of the expansion subset of concepts of the generated concept space.

8. The computer-implemented method of claim 7, wherein using the one or more processors configured to execute the natural language processing application further includes:

the one or more processors displaying, on the user interface, a representation of the concept space of the candidate term, the representation including, for each one or more latently-associated concepts of the candidate term, a respective indication of its association with a respective explicitly-associated or implicitly-associated concept from which the respective latent association was derived; and the one or more processors optionally displaying, on the user interface, a representation of knowledge other than the concept space that is discovered as being associated with the candidate term.

9. The computer-implemented method of claim 8, wherein using the one or more processors configured to execute the natural language processing application further includes:

the one or more processors receiving an indication of a user input indicative of a modification to the representation of the concept space;

the one or more processors applying, based on the modification, at least one of the first semantic analysis technique or the second semantic analysis technique to at least one of the concept space of the candidate term or the digital corpus; and the one or more processors displaying, on the user interface, an updated representation of the concept space of the candidate term or a representation of a different concept space based on the application of the at least one of the first semantic analysis technique or the second semantic analysis technique to the at least one of the concept space for the candidate term or the digital corpus.

10. The computer-implemented method of claim 7, wherein the one or more processors applying the first semantic analysis technique to the digital corpus comprises the one or more processors applying one of an explicit semantic analysis technique or an implicit semantic analysis technique to the digital corpus, the explicit semantic analysis technique being one of Explicit Semantic Analysis (ESA), Salient Semantic Analysis (SSA), a Novel Approach to a Semantically-Aware Representation of Items (NASARI), a dictionary-based semantic analysis technique, a co-occurrence semantic analysis technique, or another explicit semantic modeling technique; and the implicit semantic analysis technique being one of Latent Semantic Analysis (LSA), Latent Dirichlet Allocation (LDA), another implicit technique that utilizes a probabilistic model, CW vectors, Word2Vec, GloVe, another implicit technique that utilizes neural network model, or another implicit semantic modeling technique.

11. The computer-implemented method of claim 7, wherein using the one or more processors configured to execute the natural language processing application further includes the one or more processors limiting a search space of the first semantic analysis technique based on a set of search-limiting parameters, the set of search-limiting parameters including at least one of: a minimum length of each corpus record included in the search, a field of search of the each corpus record included in the search, a maximum number of corpus records to retrieve for the search, or a maximum number of words of a title or name of the each corpus record included in the search.

12. The computer-implemented method of claim 7, wherein using the one or more processors configured to execute the natural language processing application further includes the one or more processors generating the set of concept association rules, including the mining of the set of transactions of the digital corpus to discover the set of concept association rules, each transaction of the set of corpus transactions indicating (i) a respective base concept of a respective particular record of the digital corpus, and (ii) and a respective set of other concepts of one or more other records of the digital corpus, the one or more other records respectively indicated by one or more record-links included in the respective particular record of the digital corpus.

13. The computer-implemented method of claim 12, wherein using the one or more processors configured to execute the natural language processing application further includes the one or more processors generating the set of transactions, including mining the plurality of records of the digital corpus for record-links included therein.

14. The computer-implemented method of claim 7, wherein the candidate term is a first candidate term and the concept space is a first concept space, and wherein using the one or more processors configured to execute the natural language processing application further includes:

the one or more processors receiving a second candidate term, the second candidate term comprising a respective one or more natural language words;

the one or more processors generating a second concept space for the second candidate term using the first semantic analysis technique and the second semantic analysis technique; and the one or more processors determining a measure of relatedness between the first candidate term and the second candidate term based on respective weights of the first concept space of the first candidate term and the second concept space of the second candidate term.

15. A computer-implemented method of processing text, the computer-implemented method comprising:

using one or more processors configured to execute a natural language processing application, including:

the one or more processors receiving, via a user interface, a candidate term comprising one or more natural language terms;

the one or more processors discovering, using one or more semantic analysis techniques, an initial subset of concepts of a digital corpus that are at least one of explicitly or implicitly associated with the candidate term, the digital corpus comprising natural language;

the one or more processors mining the digital corpus for a set of concept association rules of the digital corpus, the set of concept association rules determined based on record-links included in a plurality of records of the digital corpus, and the mining of the digital corpus including:

for each candidate rule corresponding to the set of concept association rules, (i) determining a respective measure of support based on a number of occurrences, in a transaction dictionary of the digital corpus, of a set of antecedent concepts of the each candidate rule together with a set of consequence concepts of the each candidate rule; and (ii) determining a respective measure of confidence based on the respective measure of support and a number of occurrences, in the transaction dictionary of the digital corpus, of the set of antecedent concepts of the each candidate rule;

determining a set of candidate rules as the set of concept association rules; and limiting a size of the set of concept association rules based on a set of rule-limiting parameters, the set of rule-limiting parameters including at least one of: a number of concepts included in the set of consequence concepts, a minimum strength of the respective measure of support, or a minimum strength of the respective measure of confidence;

the one or more processors discovering, based on the mined set of concept association rules and the discovered initial subset of concepts of the digital corpus that are at least one of explicitly or implicitly associated with the candidate term, an expansion subset of concepts of the digital corpus that are latently associated with the candidate term;

the one or more processors generating a concept space of the candidate term from at least a portion of the initial subset of concepts and at least a portion of the expansion subset of concepts, wherein each concept included in the concept space comprises a respective one or more natural language terms;

the one or more processors searching, using the generated concept space, the digital corpus for a first set of records corresponding to the at least the portion of the initial subset of concepts of the generated concept space and a second set of records corresponding to the at least the portion of the expansion subset of concepts of the generated concept space;

the one or more processors retrieving, from the digital corpus, at least a portion of each record included in the second set of records corresponding to the at least the portion of the expansion subset of concepts of the generated concept space; and the one or more processors displaying, at the user interface, the retrieved at least the portion of the each record included in the second set of records corresponding to the at least the portion of the expansion subset of concepts of the generated concept space.

16. The computer-implemented method of claim 15, wherein the one or more processors determining the set of candidate rules as the set of concept association rules is further based on a concept weight threshold, and wherein a respective weight of a respective concept is indicative of a degree of matching between the respective concept and the candidate term.

17. The computer-implemented method of claim 15, wherein the one or more processors mining the digital corpus for the set of concept association rules comprises the one or more processors mining at least one of: an encyclopedia, a dictionary, a set of health-related articles and/or records, a set of patents and/or patent publications, or a set of financial information articles and/or records.

18. The computer-implemented method of claim 15, wherein the one or more processors discovering the expansion subset of concepts that are latently associated with the candidate term based on the set of concept association rules and the initial subset of concepts comprises, for each concept included in the initial subset of concepts, the one or more processors mining the set of concept association rules to determine a set of concepts that are latently associated with the each concept included in the initial subset of concepts.

* * * * *